US012574462B2

(12) United States Patent (10) Patent No.: US 12,574,462 B2
Chai (45) Date of Patent: Mar. 10, 2026

(54) COUNTER SUBSCRIPTION METHOD

(71) Applicant: Huawei Technologies Co., Ltd.,
Shenzhen (CN)

(72) Inventor: Xiaoqian Chai, Dongguan (CN)

(73) Assignee: Huawei Technologies Co., Ltd.,
Shenzhen (CN)

( * ) Notice: Subject to any disclaimer, the term of this
patent is extended or adjusted under 35
U.S.C. 154(b) by 506 days.

(21) Appl. No.: 18/148,885

(22) Filed: Dec. 30, 2022

(65) Prior Publication Data

US 2023/0135630 A1 May 4, 2023

Related U.S. Application Data

(63) Continuation of application No.
PCT/CN2021/097612, filed on Jun. 1, 2021.

(30) Foreign Application Priority Data

Jul. 2, 2020 (CN) .......................... 202010634583.9

(51) Int. Cl.
*H04M 15/00* (2024.01)
*H04W 4/24* (2018.01)
(52) U.S. Cl.
CPC ........... *H04M 15/66* (2013.01); *H04M 15/60*
(2013.01); *H04W 4/24* (2013.01)
(58) Field of Classification Search
CPC .. H04M 15/66; H04M 15/60; H04M 15/8016;
H04W 4/24; H04L 12/1407; H04L
12/1485
See application file for complete search history.

(56) References Cited

U.S. PATENT DOCUMENTS

| | | | |
|---|---|---|---|
| 10,637,753 B1 | 4/2020 | Taft et al. | |
| 2020/0092424 A1 | 3/2020 | Qiao et al. | |
| 2021/0258406 A1* | 8/2021 | Ali ...................... | H04W 68/005 |
| 2022/0191052 A1* | 6/2022 | Garcia Azorero .. | H04L 12/1407 |

FOREIGN PATENT DOCUMENTS

| | | |
|---|---|---|
| CN | 109600262 A | 4/2019 |
| CN | 111200845 A | 5/2020 |

OTHER PUBLICATIONS

3GPP TS 32.290 V16.3.0 (Dec. 2019), 3rd Generation Partnership
Project; Technical Specification Group Services and System Aspects;
Telecommunication management; Charging management; 5G sys-
tem; Services, operations and procedures of charging using Service
Based Interface (SBI) (Release 16), 34 pages.

(Continued)

*Primary Examiner* — Christopher M Brandt
(74) *Attorney, Agent, or Firm* — Slater Matsil, LLP

(57) ABSTRACT

Embodiments of this application disclose a service process-
ing method and product, applied to a charging field in a
network architecture for a slice instance. The policy control
device sends a subscription request to a charging processing
device, where the subscription request carries an identifier of
a first slice instance and an identifier of user equipment.
Then, the policy control device receives a subscription
response returned by the charging processing device, where
the subscription response includes first information of a first
counter corresponding to the first slice instance and a
subscription identifier.

20 Claims, 14 Drawing Sheets

350: Receive a first update request for a subscription resource

352: Store related information in related information of the subscription resource

(56) References Cited

OTHER PUBLICATIONS

3GPP Ts 23.503 V15.1.0 (Mar. 2018), 3rd Generation Partnership Project; Technical Specification Group Services and System Aspects; Policy and Charging Control Framework for the 5G System; Stage 2 (Release 15), 65 pages.

3GPP TS 23.503 V16.0.0 (Mar. 2019), 3rd Generation Partnership Project; Technical Specification Group Services and System Aspects; Policy and Charging Control Framework for the 5G System; Stage 2 (Release 16), 84 pages.

* cited by examiner

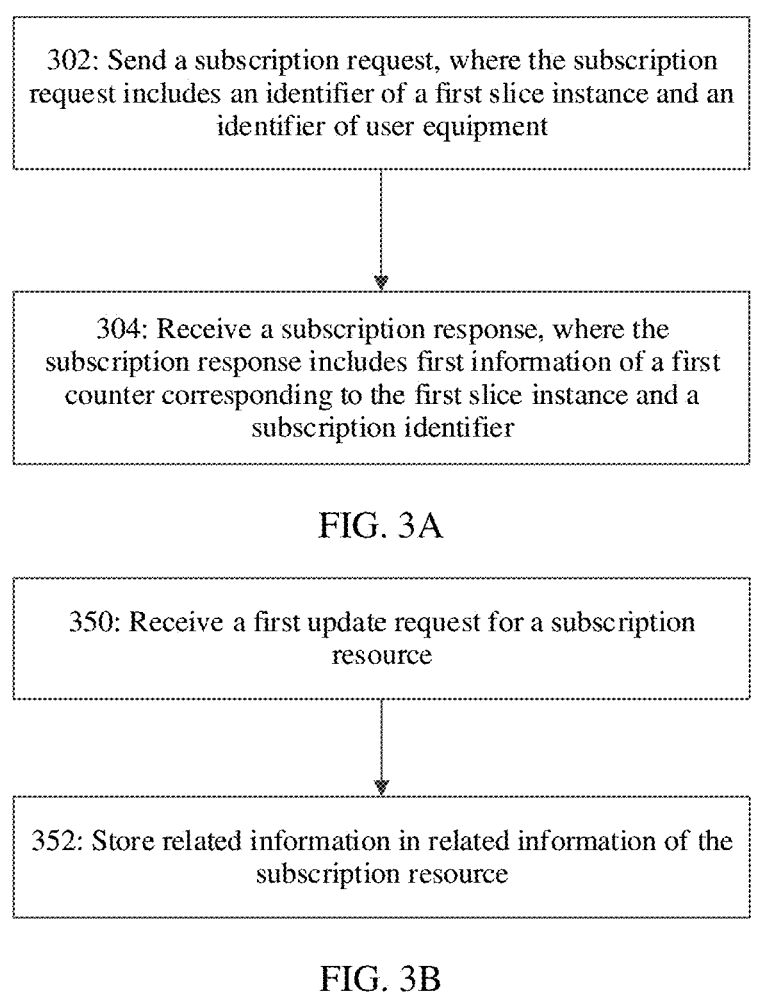

302: Send a subscription request, where the subscription request includes an identifier of a first slice instance and an identifier of user equipment 304: Receive a subscription response, where the subscription response includes first information of a first counter corresponding to the first slice instance and a subscription identifier

FIG. 3A

350: Receive a first update request for a subscription resource

352: Store related information in related information of the subscription resource

FIG. 3B

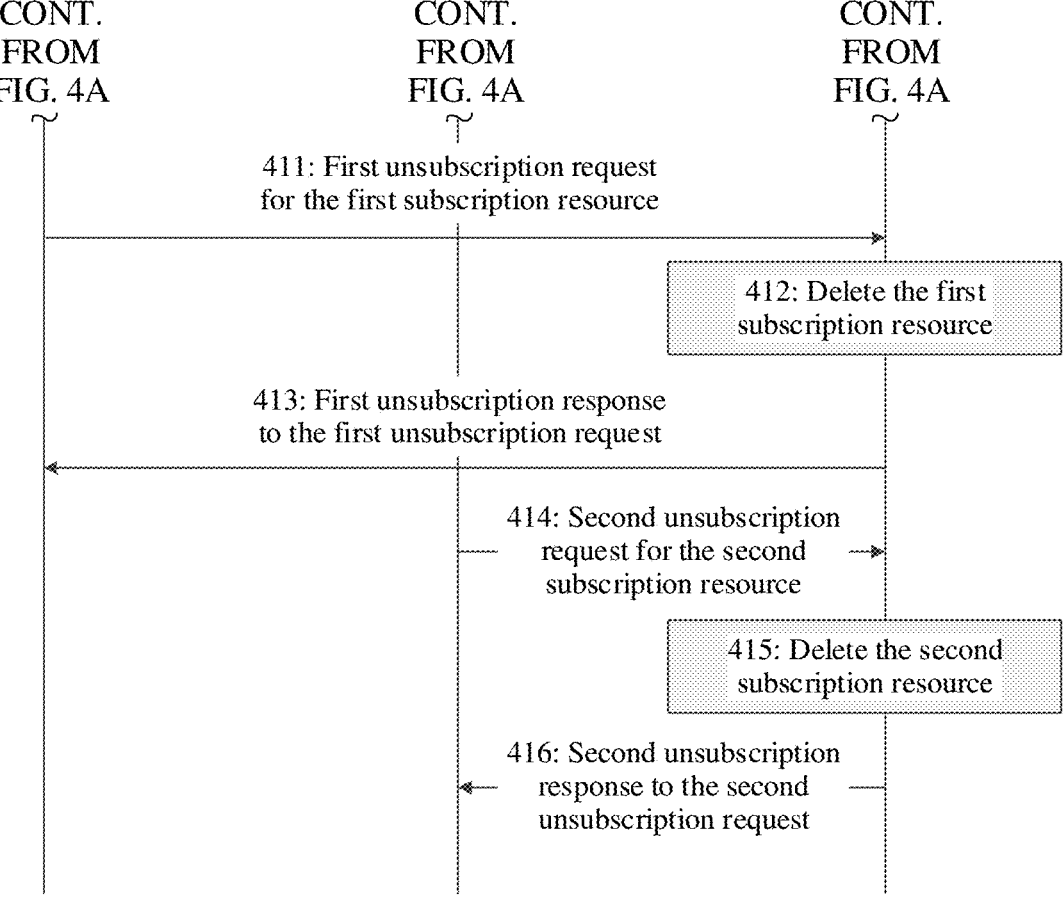

CONT.
FROM
FIG. 4A

CONT.
FROM
FIG. 4A

CONT.
FROM
FIG. 4A

411: First unsubscription request
for the first subscription resource

412: Delete the first
subscription resource

413: First unsubscription response
to the first unsubscription request

414: Second unsubscription
request for the second
subscription resource

415: Delete the second
subscription resource

416: Second unsubscription
response to the second
unsubscription request

FIG. 4B

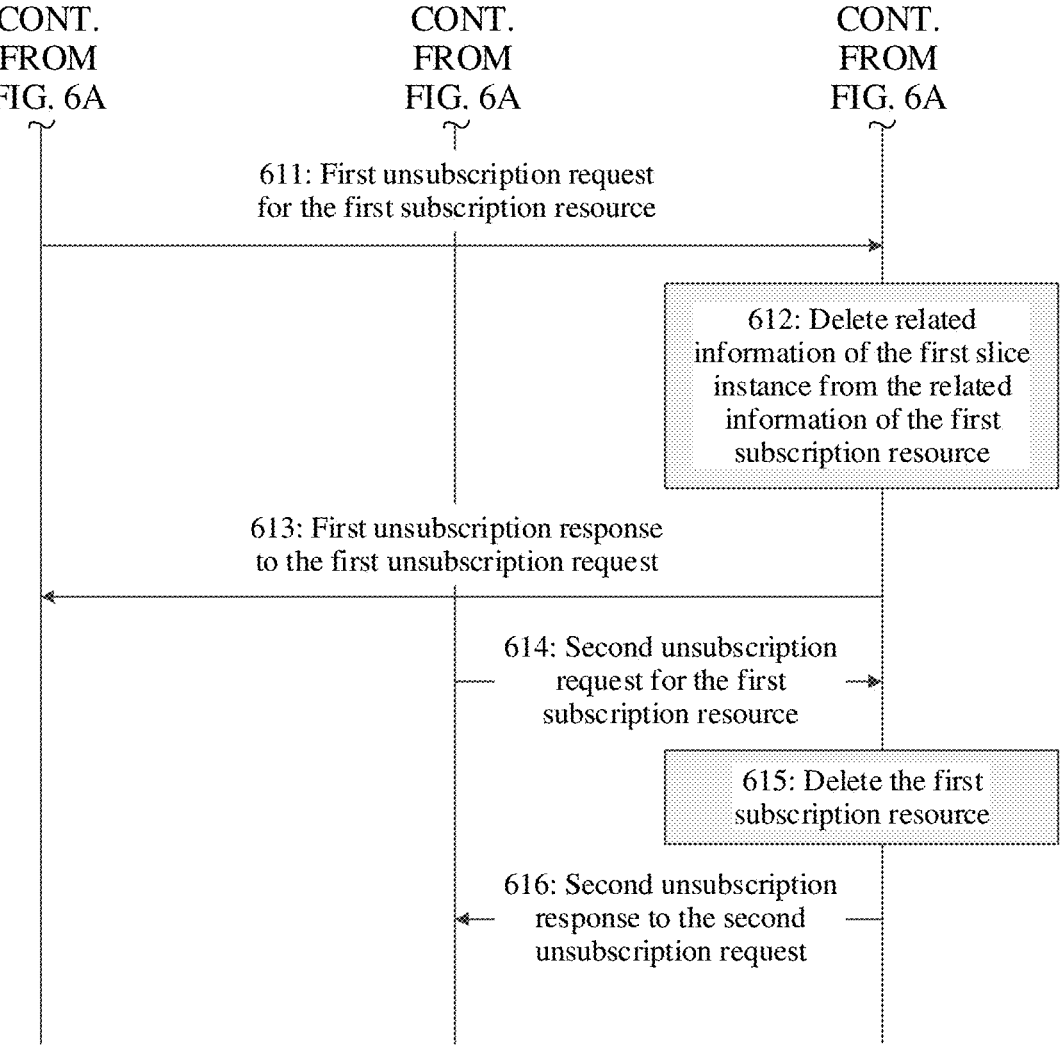

CONT.
FROM
FIG. 6A

CONT.
FROM
FIG. 6A

CONT.
FROM
FIG. 6A

611: First unsubscription request
for the first subscription resource

612: Delete related
information of the first slice
instance from the related
information of the first
subscription resource 613: First unsubscription response
to the first unsubscription request 614: Second unsubscription
request for the first
subscription resource 615: Delete the first
subscription resource 616: Second unsubscription
response to the second
unsubscription request

FIG. 6B

COUNTER SUBSCRIPTION METHOD

CROSS-REFERENCE TO RELATED APPLICATIONS

This application is a continuation of International Patent Application No. PCT/CN2021/097612, filed on Jun. 1, 2021, which claims priority to Chinese Patent Application No. 202010634583.9, filed on Jul. 2, 2020. The disclosures of the aforementioned applications are hereby incorporated by reference in their entireties.

TECHNICAL FIELD

This application relates to the communications field, and in particular, to a counter subscription method and system in a policy control device and a charging system and a related device.

BACKGROUND

A 5G (5th Generation) network defined by the International Telecommunication Union (ITU) supports a plurality of usage scenarios and applications. The plurality of usage scenarios and applications include services that require ultra-reliable low-latency communication, for example, services in fields such as wireless control in industrial manufacturing or production processes, remote surgery, power distribution automation of smart grids, and transportation security.

Network slicing technologies are used in 5G networks, to meet a large quantity of industry applications with diversified network requirements. Network slices are essentially to run a plurality of virtual networks on a shared physical network infrastructure. Each virtual network is obtained through division based on different service requirements, such as a latency, bandwidth, security, and reliability, to flexibly cope with different network application scenarios.

Currently, in 5G networks, types of network slices, for example, enhanced mobile broadband (eMBB), ultra-reliable low-latency communication (URLLC), massive machine-type communications (mMTC), and vehicle to everything (V2X), may be included. Each type of network slice may have one or more network slice instances. One user equipment may access one or more network slice instances to use a service.

In a network slicing scenario in a 5G network, user equipment may access a plurality of network slice instances at the same time, and a charging processing device may provide charging for the user equipment on the plurality of network slice instances.

A policy control device is configured to provide a control policy (including a QoS policy and/or a charging policy) of a user service for a session management function device. The policy control device may be a policy control function (PCF) device defined in the 3GPP standard specification.

When generating the control policy of the user service, the policy control device may need to be based on information about a counter (for example, a status of the counter) of the user equipment. To obtain the information about the counter of the user equipment, the policy control device needs to obtain current information of the counter from the charging processing device, and subscribe to a change of the information about the counter of the user equipment from the charging processing device, so that the charging processing device sends a notification to the policy control device when determining that the subscribed information about the counter changes.

In a current 5G network architecture, the policy control device requests the charging processing device to create a subscription resource for the user equipment at a granularity of user equipment. In a case of a plurality of network slice instances, one user equipment may access the plurality of network slice instances. As a result, in an existing method for obtaining a subscription resource and subscribing to information about a counter of user equipment, a scenario in which a plurality of network slice instances exist cannot be supported, a subscription resource cannot be created for a plurality of network slice instances (for example, when a policy control device is deployed on a network slice instance) or a valid counter cannot be configured (for example, when a policy control device is deployed on a network slice instance, and the network slice instance is dynamically created and allocated), and slice granularity-based refined operation of an operator cannot be supported.

SUMMARY

In view of this, it is necessary to provide a counter subscription method, to subscribe to a counter corresponding to a slice instance in a network architecture for the slice instance.

According to a first aspect, an embodiment of this application provides a counter status subscription method performed by a policy control device. The policy control device sends a subscription request to a charging processing device, where the subscription request carries an identifier of a first slice instance and an identifier of user equipment. Then, the policy control device receives a subscription response returned by the charging processing device, where the subscription response includes first information of a first counter corresponding to the first slice instance and a subscription identifier. The subscription request is used to request to subscribe to information about the counter corresponding to the slice instance. According to the present invention, in a network architecture for the slice instance, the policy control device may subscribe to, by using the subscription request that carries the identifier of the first slice instance, the counter corresponding to the first slice instance. Further, the policy control device can formulate a control policy related to the slice instance.

In a possible implementation, before sending the subscription request, the policy control device receives the identifier of the first slice instance accessed by the user equipment. Then, the policy control device determines, based on subscription information of the user equipment, that information about the first counter that is of the user equipment and that corresponds to the first slice instance needs to be subscribed to. According to this method, the subscription information is used to determine that the information about the counter corresponding to the first slice instance needs to be subscribed to, so that subscription to the information about the counter can be refined to a slice instance level, to make the subscription more accurate.

In a possible implementation, the identifier of the first slice instance may be used to obtain the subscription information. The policy control device may determine, based on the subscription information of the user, that a policy decision for the user equipment depends on a status of the first counter that is accessed by the user equipment and that corresponds to the first slice instance.

In a possible implementation, the policy control device receives a protocol data unit session policy request that is of the user equipment on the first slice instance and that is sent by a session management function device, where the policy request indicates the identifier of the first slice instance. Therefore, the policy control device obtains, based on the identifier of the first slice instance, the subscription information that is of the user and that is related to the first slice instance.

In a possible implementation, the subscription request may carry an identifier of the first counter. Therefore, the policy control device determines, based on the subscription information, the identifier of the first counter to be subscribed to, so that the charging processing device can be prevented from determining the identifier of the first counter, to simplify processing of the charging processing device.

In a possible implementation, the subscription request is a subscription request corresponding to the first slice instance, the subscription request is used to request to create, for the user equipment, a first subscription resource corresponding to the first slice instance, the identifier that is of the first slice instance and that is carried in the subscription request corresponding to the first slice instance is used to indicate that the first subscription resource is a subscription resource corresponding to the first slice instance, and the first subscription request further carries a notification address corresponding to the first slice instance. The policy control device indicates the charging processing device to create the first subscription resource corresponding to the first slice instance. In this way, the subscription resource is bound to the slice instance, so that management of the subscription resource is more accurate.

In a possible implementation, the policy control device receives a first notification message sent by the charging processing device by using the notification address corresponding to the first slice instance, where the first notification message carries the identifier of the first slice instance, second information of the first counter, or a subscription termination indication of the first subscription. Then, the policy control device generates an update control policy of the user equipment based on the second information of the first counter, or the policy control device requests, based on the subscription termination indication of the first subscription, to delete the first subscription resource corresponding to the first slice instance. The first subscription corresponds to the first subscription resource. The notification message is received by using the notification address, so that policy update or subscription termination may be performed on the first slice instance.

In a possible implementation, the policy control device determines that the first subscription resource corresponding to the first slice instance needs to be unsubscribed from. Then, the policy control device sends an unsubscription request for the first subscription resource to the charging processing device. The first subscription resource of the first slice instance is unsubscribed from, so that management of the first subscription resource related to the first slice instance is more complete.

In a possible implementation, when the subscription request is a subscription request corresponding to the user equipment, the subscription request corresponding to the user equipment is used to request to create a fourth subscription resource for the user equipment. The identifier that is of the first slice instance and that is carried in the subscription request corresponding to the user equipment is an identifier of a slice instance corresponding to the first counter of the user equipment, the identifier of the first slice instance is used to indicate to subscribe to the information about the first counter that is of the user equipment and that corresponds to the first slice instance, and the subscription request corresponding to the user equipment further carries a notification address corresponding to the user equipment. The first information of the first counter corresponding to the first slice instance includes a first status of the first counter and the identifier of the corresponding first slice instance. The policy control device indicates the charging processing device to create the fourth subscription resource of the user equipment, where the fourth subscription resource is a subscription resource shared by at least two slice instances. In related information of the fourth subscription resource, the first counter is bound to the first slice instance, so that management of the subscription resource is simpler.

In a possible implementation, the policy control device receives a first notification message sent by the charging processing device by using the notification address corresponding to the user equipment, where the first notification message carries second information of the first counter, and the second information includes a second status of the first counter and the identifier of the first slice instance. The policy control device generates an update control policy of the user equipment based on the second information of the first counter. The second information includes the second status of the first counter and the identifier of the first slice instance, so that control on a protocol data unit session of the user equipment on the first slice instance is more accurate.

In a possible implementation, the subscription request further includes an identifier of the policy control device, where the identifier of the policy control device is used to indicate the charging processing device to determine subscription requests as different subscription requests when the charging processing device receives the subscription requests sent by different policy control devices. According to this application, regardless of whether the policy control device is deployed on a slice instance or outside a slice instance, different subscription requests may be determined by using the identifier of the policy control device, to manage subscription to counters of different slice instance.

In a possible implementation, the policy control device determines that information about a second counter corresponding to a second slice instance needs to be subscribes to. The policy control device sends a first update request for the fourth subscription resource to the charging processing device, where the first update request includes a third subscription identifier, an identifier of the second counter, and an identifier of the second slice instance corresponding to the second counter. The first slice instance and the second slice instance share the fourth subscription resource, so that management of the third subscription resource is more simplified.

In a possible implementation, the policy control device determines that the information about the second counter corresponding to the second slice instance needs to be unsubscribed from. The policy control device generates a second update request for the fourth subscription resource, where the second update request includes an identifier that is of a counter and that is obtained after the identifier of the second counter corresponding to the second slice instance is deleted from a counter set subscribed to by the user. The policy control device sends the second update request for the fourth subscription resource to the charging processing device. The counter corresponding to the first slice instance is unsubscribed from, so that when a plurality of slice instances correspond to a same subscription resource, subscription to the counter corresponding to the first slice instance is more complete and accurate.

In a possible implementation, the policy control device determines to unsubscribe from the first subscription resource of the user equipment. The policy control device sends the unsubscription request for the first subscription resource to the charging processing device. When a plurality of slice instances correspond to a same subscription resource, the entire subscription resource is unsubscribed from, so that subscription to the counter by all slice instances accessed by the user equipment is canceled. In this way, subscription of each slice instance to the counter is more complete.

According to a second aspect, an embodiment of this application provides a counter information subscription method. In the method, a charging processing device receives a subscription request, where the subscription request includes an identifier of a first slice instance and an identifier of user equipment. The charging processing device returns a subscription response, where the subscription response includes first information of a first counter corresponding to the first slice instance and a subscription identifier, and the subscription identifier is used to identify a subscription resource. According to this method, in a network architecture for a slice instance, subscription to a counter corresponding to the slice instance can be implemented, so that a control policy related to the slice instance can be formulated.

In a possible implementation, the subscription request is a subscription request corresponding to the first slice instance, information about the first slice instance is used to request to create, for the first slice instance, a first subscription resource corresponding to the first slice instance, and the first subscription request further carries a notification address corresponding to the first slice instance. The charging processing device creates the first subscription resource corresponding to the first slice instance, and stores related information of the first subscription resource, where the related information of the first subscription resource includes the identifier of the first slice instance, the notification address corresponding to the first slice instance, and an identifier of the first counter. According to this method, the first subscription resource is bound to the slice instance, so that management of the subscription resource is more accurate.

In a possible implementation, the charging processing device receives an unsubscription request for the first subscription resource, where the unsubscription request for the first subscription resource carries a first subscription identifier. The charging processing device deletes, based on the first subscription identifier, the first subscription resource corresponding to the first slice instance. The first subscription resource of the first slice instance is unsubscribed from, so that management of the first subscription resource related to the first slice instance is more complete.

In a possible implementation, the charging processing device receives a subscription request corresponding to a second slice instance, where the subscription request corresponding to the second slice instance carries an identifier of the second slice instance and the identifier of the user equipment. The charging processing device determines, based on the identifier of the user equipment, that the first subscription resource of the user equipment exists, and updates the related information of the first subscription resource. The charging processing device returns a subscription response to the subscription request corresponding to the second slice instance, where the subscription response to the subscription request corresponding to the second slice instance includes first information of a second counter corresponding to the second slice instance and the first subscription identifier. According to the method, both the first slice instance and the second slice instance correspond to the first subscription resource, so that processing of the charging processing device can be simplified.

In a possible implementation, the charging processing device receives an unsubscription request for the first subscription resource, where the unsubscription request for the first subscription resource carries the identifier of the second slice instance and the first subscription identifier. The charging processing device determines that the first subscription resource is associated with only the second slice instance, and deletes the first subscription resource. Alternatively, the charging processing device determines that the first subscription resource is associated with at least two slice instances, and updates the related information of the first subscription resource. According to the method, both the first slice instance and the second slice instance correspond to the first subscription resource, so that unsubscription of the first slice instance and/or unsubscription of the second slice instance can be implemented. In this way, when a plurality of slice instances correspond to a same subscription resource, management of the subscription resource is more complete.

In a possible implementation, the charging processing device receives a subscription request corresponding to a second slice instance, where the subscription request corresponding to the second slice instance carries an identifier of the second slice instance and the identifier of the user equipment. The charging processing device creates, for the user equipment based on the identifier of the second slice instance and the identifier of the user equipment, a second subscription resource corresponding to the second slice instance, and stores related information of the second subscription resource. The charging processing device returns a subscription response to the subscription request corresponding to the second slice instance, where the subscription response includes first information of a second counter corresponding to the second slice instance and a second subscription identifier. The second subscription identifier is used to identify the second subscription resource. According to the method, subscription resources (the first subscription resource and the second subscription resource) are separately created for the first slice instance and the second slice instance, so that processing of the charging processing device can be simplified.

In a possible implementation, when the charging processing device determines that information about the first counter or the second counter changes, the charging processing device sends a first notification message by using the notification address corresponding to the first slice instance or a notification address corresponding to the second slice instance, where the first notification message carries second information of the first counter or the second counter, and the identifier of the first slice instance or the identifier of the second slice instance.

In a possible implementation, when the subscription request is a subscription request corresponding to the user equipment, the subscription request corresponding to the user equipment is used to request to create, for the user equipment, a fourth subscription resource corresponding to the user equipment, and the identifier that is of the first slice instance and that is carried in the subscription request corresponding to the user equipment is an identifier of a slice instance corresponding to the first counter of the user equipment. The charging processing device creates, for the user equipment based on the identifier of the user equipment, the fourth subscription resource corresponding to the user equipment, where the first information of the first counter corresponding to the first slice instance includes a first status of the first counter and the identifier of the corresponding first slice instance. A shared subscription resource is created for different slice instances accessed by the user equipment, so that management of subscription resources of the different slice instances is more accurate.

In a possible implementation, the charging processing device receives a first update request for the fourth subscription resource, where the first update request carries an identifier of a second counter and an identifier of a second slice instance corresponding to the second counter; and stores, in related information of the fourth subscription resource, the identifier of the second counter and the identifier of the second slice instance corresponding to the second counter. A shared subscription resource is created for different slice instances accessed by the user equipment, so that management of subscription resources of the different slice instances is more accurate.

In a possible implementation, when the charging processing device determines that information about the first counter or the second counter changes, the charging processing device sends a notification message, where the notification message carries second information of the first counter and the identifier of the first slice instance corresponding to the first counter, or the notification message carries second information of the second counter and the identifier of the second slice instance corresponding to the second counter.

In a possible implementation, the subscription request is a subscription request sent by a first policy control device, and the subscription request further carries an identifier of the first policy control device. The charging processing device receives an eighth subscription request sent by a second policy control device, where the eighth subscription request carries the identifier of the user equipment and an identifier of the second policy control device. The charging processing device determines, based on the identifier of the user equipment and the identifier of the second policy control device, that a subscription resource that is of the user equipment and that corresponds to the second policy control device does not exist, and the charging processing device creates a fourth subscription resource for the user equipment; or the charging processing device determines, based on the identifier of the user equipment and the identifier of the second policy control device, that a subscription resource that is of the user equipment and that corresponds to the second policy control device does not exist, and the charging processing device updates related information of an existing subscription resource of the user equipment. A subscription resource created by the user equipment and counters of different slice instances are bound, to implement diversified management of the subscription resource.

According to a third aspect, an embodiment of this application provides a counter information subscription method. A charging processing device receives a first update request for a subscription resource, where the first update request carries a subscription identifier, an identifier of a first slice instance, and an identifier of a first counter that the first slice instance needs to subscribe to; and stores the identifier of the first counter and the identifier of the first slice instance in related information of the subscription resource. According to this method, after the subscription resource has been created for user equipment, information about the first counter subscribed to by the slice instance may still be stored in the related information of the subscription resource in a scenario in which the user equipment accesses the slice instance, so that the first counter corresponds to the first slice instance, to meet subscription implemented after the user equipment accesses the slice instance.

In a possible implementation, the charging processing device further accesses a second update request for the subscription resource, where the update request carries the identifier of the first counter and the identifier of the first slice instance most corresponding to the first counter, and the update request is used to remove subscription to a counter corresponding to a second slice instance; and the charging processing device updates related information of a first subscription resource based on the second update request.

According to a fourth aspect, an embodiment of this application provides a counter information subscription method. A policy control device sends a first update request for a subscription resource, where the first update request carries a subscription identifier, an identifier of a first slice instance, and an identifier of a first counter that the first slice instance needs to subscribe to. The policy control device receives an update response to the subscription resource. According to this method, after the subscription resource has been created for user equipment, the user equipment may still request to update a first subscription resource in a scenario in which the user equipment accesses the slice instance, so that the first counter corresponds to the first slice instance, to meet subscription implemented after the user equipment accesses the slice instance.

In a possible implementation, after determining that the user equipment already has the first subscription resource, the policy control device sends the update request for the first subscription resource to a charging processing device.

According to a fifth aspect, an embodiment of this application provides a counter information subscription method.

According to a fifth aspect, an embodiment of this application provides a counter information subscription method. A policy control device sends a first subscription request to a charging processing device, where the first subscription request carries an identifier of a first slice instance, an identifier of user equipment, and a notification address corresponding to the first slice instance. The charging processing device sends a first subscription response to the policy control device, where the first subscription response includes a first status of a first counter corresponding to the first slice instance and a first subscription identifier.

According to a sixth aspect, a policy control apparatus is provided. The apparatus has a function of implementing the policy control apparatus according to the first aspect or the fourth aspect. The function may be implemented by hardware, or may be implemented by hardware executing corresponding software. The hardware or the software includes one or more modules corresponding to the function.

According to a seventh aspect, a charging processing apparatus is provided. The apparatus has a function of implementing the charging processing apparatus according to the second aspect or the third aspect. The function may be implemented by hardware, or may be implemented by hardware executing corresponding software. The hardware or the software includes one or more modules corresponding to the function.

According to an eighth aspect, an embodiment of this application provides a counter information subscription system. The system includes a policy control device and a charging processing device. The policy control device may perform the method performed by the policy control device according to any one of the first aspect or the possible solutions of the first aspect. The charging processing device may perform the method performed by the charging processing device according to any one of the second aspect or the possible solutions of the second aspect.

According to a ninth aspect, an embodiment of this application provides a counter information subscription system. The system includes a policy control device and a charging processing device. The policy control device may perform the method performed by the policy control device according to any one of the fourth aspect or the possible solutions of the fourth aspect. The charging processing device may perform the method performed by the charging processing device according to any one of the third aspect or the possible solutions of the third aspect.

According to a tenth aspect, an embodiment of this application provides a charging processing device. The device includes a processor and a memory, where the memory is configured to store program instructions; and the processor is configured to invoke and execute the program instructions stored in the memory, so that the charging processing device performs the method according to any one of the second aspect or the possible solutions of the second aspect, or any one of the third aspect or the possible solutions of the third aspect.

According to an eleventh aspect, an embodiment of this application provides a computer-readable storage medium. The medium includes instructions. When the instructions are run on a computer, the computer is enabled to perform the method according to any one of the second aspect or the possible solutions of the second aspect, or any one of the third aspect or the possible solutions of the third aspect.

According to a twelfth aspect, an embodiment of this application provides a policy control device. The device includes a processor and a memory, where the memory is configured to store program instructions; and the processor is configured to invoke and execute the program instructions stored in the memory, so that a session management function device performs the method according to any one of the first aspect or the possible solutions of the first aspect, or any one of the fourth aspect or the possible solutions of the fourth aspect.

According to a thirteenth aspect, an embodiment of this application provides a computer-readable storage medium. The medium includes instructions. When the instructions are run on a computer, the computer is enabled to perform the slice instance-based counter subscription method according to any one of the first aspect or the possible solutions of the first aspect.

According to a fourteenth aspect, an embodiment of this application provides a chip. When the chip is run, the chip is configured to implement the method according to any one of the first aspect, the second aspect, the third aspect, the fourth aspect, the possible implementation solutions of the first aspect, the possible implementation solutions of the second aspect, the possible implementation solutions of the second aspect, the possible implementation solutions of the third aspect, or the possible implementation solutions of the fourth aspect.

BRIEF DESCRIPTION OF THE DRAWINGS

FIG. 3A is a flowchart of a counter information subscription method according to an embodiment of this application;

FIG. 3B is a flowchart of another counter information subscription method according to an embodiment of this application;

FIG. 4A and FIG. 4B are a flowchart of a counter information subscription method by a policy control device based on the system architecture in FIG. 2A according to an embodiment of this application;

FIG. 6A and FIG. 6B are a flowchart of a counter information subscription method by a policy control device based on the system architecture in FIG. 2A according to an embodiment of this application;

DETAILED DESCRIPTION OF ILLUSTRATIVE EMBODIMENTS

The following describes technical solutions in embodiments of this application with reference to the accompanying drawings in embodiments of this application. In descriptions of this application, "/" indicates an "or" relationship between associated objects unless otherwise specified. For example, A/B may indicate A or B. The term "and/or" in this application indicates an association relationship for describing associated objects and indicates that three relationships may exist. For example, A and/or B may indicate the following three cases: Only A exists, both A and B exist, and only B exists, where A and B may be singular or plural. In addition, in descriptions of this application, unless otherwise specified, "a plurality of" means two or more than two. In addition, to clearly describe the technical solutions in embodiments of this application, terms such as "first" and "second" are used in embodiments of this application to determine same items or similar items that provide basically same functions or purposes. A person skilled in the art may understand that the terms such as "first" and "second" do not limit a quantity or an execution sequence, and the terms such as "first" and "second" do not indicate a definite difference.

Figure 1A:
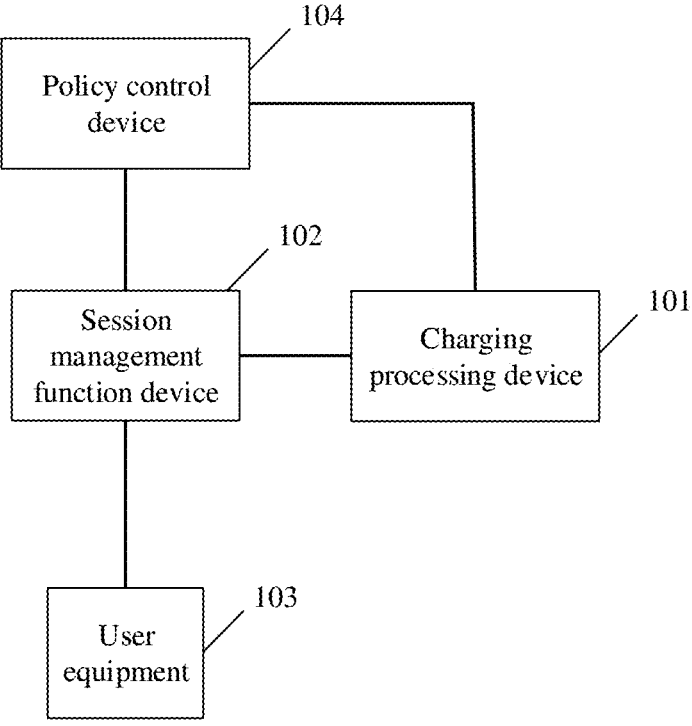
FIG. 1A is a schematic diagram of a system architecture to which an embodiment of this application is applied.

FIG. 1A is a diagram of an architecture of a system that can be used for policy control and charging according to an embodiment of this application. The system is used to control a session management function device to process a user service, and includes a charging processing device 101, a session management function device 102, user equipment 103, and a policy control device 104. Main functions of these devices are separately described as follows:

The charging processing device 101 is communicatively connected to the session management function device 102 and the policy control device 104. The charging processing device 101 is configured to: receive a subscription request sent by the policy control device, return information about a counter (for example, a status of the counter and a value of the counter) to the policy control device, and send a notification message to the policy control device after determining that the information about the counter of the user equipment changes (for example, it is detected that the status of the counter changes from a status 1 lower than a usage limit to a status 2 exceeding the usage limit, or changes from a status 1 to a status 2 at a future time point). In addition, the charging processing device 101 is further configured to: receive an update request that is for a subscription resource and that is sent by the policy control device, and update the subscription resource of the user equipment (for example, update related information (for example, a counter list and/or an identifier of a slice instance) of the subscription resource). The charging processing device 101 is further configured to: receive an unsubscription request that is for the subscription resource and that is sent by the policy control device, and cancel subscription to the counter.

The charging processing device 101 may be a CHF (Charging Function) device defined in 3GPP standard specification, or may be a CCS (Converged Charging System) device defined in the 3GPP standard specification, and includes functions of a CHF device.

It should be understood that, during actual application, the charging system shown in FIG. 1A may have more charging processing devices 101. For example, a cluster may be constructed, including a plurality of charging processing devices 101 which are mutually backed up. This can improve a disaster recovery capability, and achieve high availability.

For ease of description, in embodiments of this application, the charging processing device 101 is sometimes directly referred to as a CHF device.

(3) request a policy of the user service from the policy control device 104, and execute the policy sent by the policy control device 104 or an update policy.

It should be understood that, during actual application, the charging system shown in FIG. 1A may have more session management function devices. The session management function devices may be communicatively connected to a same charging processing device 101 (for example, the charging processing device 101), or may be communicatively connected to different charging processing devices 101. A plurality of service start requests initiated by same user equipment for a same user service may be processed by a same session management function device or different session management function devices.

The user equipment 103 is configured to: select one or more accessed network slice instances, and send a protocol data unit session PDU session setup request to the session management function device on a selected network slice instance.

The user equipment 103 may be user equipment (UE) defined in the 3GPP standard specification, or may be a wireless access device having a wireless communication function or a wired access device having no wireless communication function, including a handheld device, a vehicle-mounted device, a wearable device, or a computing device. For example, the user equipment 103 may be a mobile phone, a tablet computer, or another wireless terminal device having a wireless transceiver function.

It should be understood that, during actual application, the system shown in FIG. 1A may have more user equipment.

The policy control device 104 is communicatively connected to the session management function device 102 and the charging processing device 101, and is configured to: obtain and subscribe to related information of the counter of the user from the charging processing device, and provide a control policy of the user service for the session management function device 102. The policy control device may further store or obtain subscription-related information, for example, a subscription identifier, an identifier of the subscribed counter, and an identifier of a slice instance corresponding to the identifier of the counter.

The policy control device 104 may be a policy control function (PCF) device defined in the 3GPP standard specification, or another device that needs to obtain charging and an information change of the device from the charging processing device.

The policy control device may be dedicated to a network slice instance (to be specific, the PCF generates a control policy only for a user service on the network slice instance, and this is also referred to as being deployed on the network slice instance in this application), or the policy control device may be shared by a plurality of network slice instances (to be specific, the PCF may generate control policies for user services on the plurality of network slice instances at the same time, and this is also referred to as being deployed outside the network slice instance in this application).

To obtain and subscribe to the information about the counter of the user equipment, the policy control device requests the charging processing device to create a subscription resource for the user equipment, where the subscription resource is used by the policy control device to obtain and subscribe to status information of the counter of the user.

It should be noted that the foregoing "connected" or "connection" includes a communication connection through one or more intermediate network devices or a direct connection.

Figure 1B:
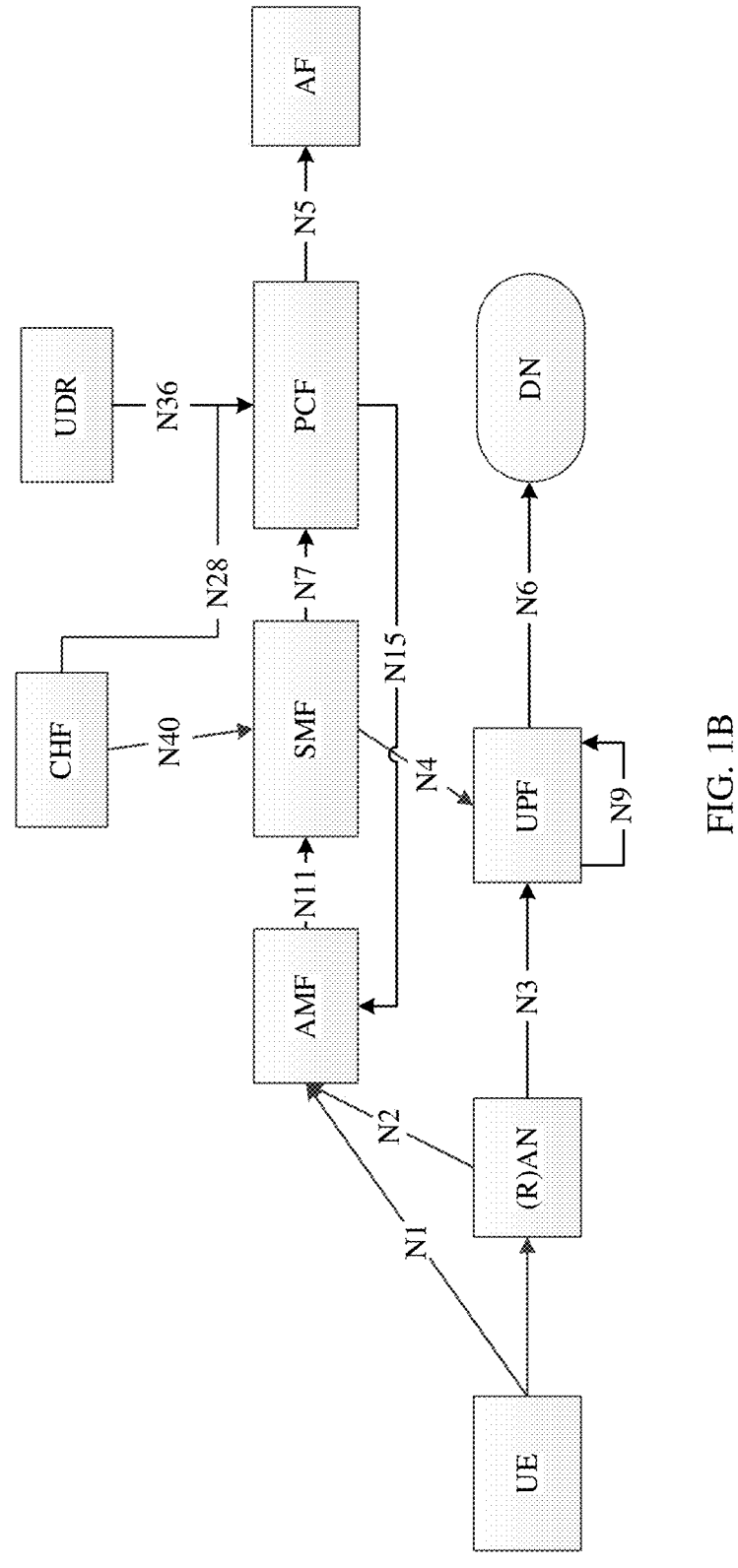
FIG. 1B is a schematic diagram of an architecture of a 5G system to which this application is applied.

FIG. 1B is a schematic diagram of an architecture of a basic 5G system. As shown in FIG. 1B, the system includes: an access and mobility management function (AMF), a session management function (SMF), a radio access network (RAN), a unified data management (UDM), a policy control function (PCF), a data network (DN), a user plane function (UPF), UE, an application function (AF), a unified data repository (UDR), and a charging function (CHF). Optionally, the following functions (not shown in FIG. 1B) may further be included in FIG. 1B: a network slice selection function (NSSF), an authentication server function (AUSF), a network exposure function (NEF), a network repository function (NRF).

Main functions of the network elements are described as follows:

The AF may be understood as a name of an application function network element in the 5G architecture. The application function network element mainly transfers a requirement of an application side on a network side, for example, a quality of service (QoS) requirement. The AF may be a third-party functional entity, or may be an operator-deployed application service, for example, an IP multimedia subsystem (IMS) voice call service.

The UDR may be understood as a name of a unified data repository network element in the 5G architecture. The unified data repository network element mainly includes the following functions: storage and retrieval of subscription data, policy data, application data, and other types of data.

The PCF may be understood as a name of a policy control function network element in the 5G architecture. The policy control function network element is mainly responsible for generating and delivering a charging policy and a QoS bandwidth control policy for a session level and a service flow level.

The SMF may be understood as a name of a session management network element in the 5G architecture. The session management network element mainly performs functions such as session management, execution of a control policy delivered by the PCF, UPF selection, and UE IP address allocation.

The CHF is a charging function. The CHF is responsible for reporting charging status information to the PCF and interacting with the SMF to implement quota management and charging control.

Functions of main interfaces in this application are described as follows:

N7 is an interface between the PCF and the SMF, and is used to request a control policy of a PDU session.

N28 is an interface between the PCF and the CHF, and is used by the PCF to subscribe to charging status information, such as a user balance status and a remaining traffic status, from the UDR.

N40 is an interface between the SMF and the CHF, and is used by the SMF to report charging information to the CHF and obtain a quota (Credit) threshold from the CHF.

Figure 2A:
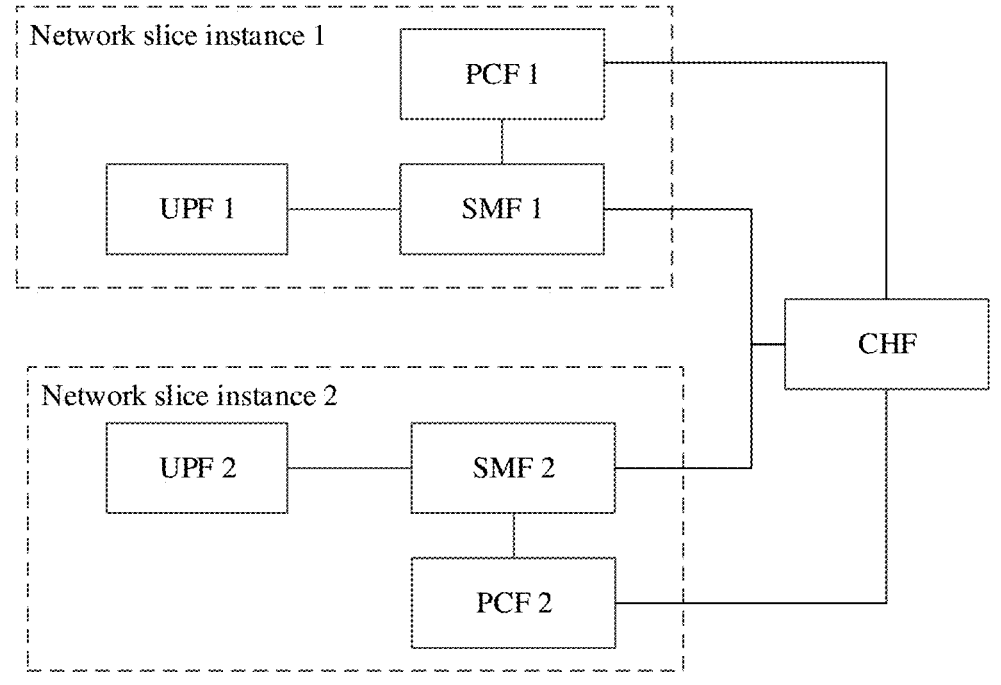
FIG. 2A is a schematic diagram of a system architecture in which a policy control device is deployed on a network slice instance in the system architecture to which this application is applied.

FIG. 2A is a schematic diagram of a system architecture in which a policy control device is deployed on a network slice instance in the system architecture to which this application is applied. The system architecture includes a network slice instance 1 (a slice instance 1 for short) and a network slice instance 2, and a charging processing device deployed outside the slice instance 1 and the slice instance 2. A user plane function (UPF) device, a session management function (SMF) device, and a policy control device (PCF) are deployed on each slice instance.

For implementing embodiments of this application by using the system architecture in FIG. 2A, refer to Table 1, FIG. 4A and FIG. 4B, and FIG. 6A and FIG. 6B.

TABLE 1

Figure 4A:
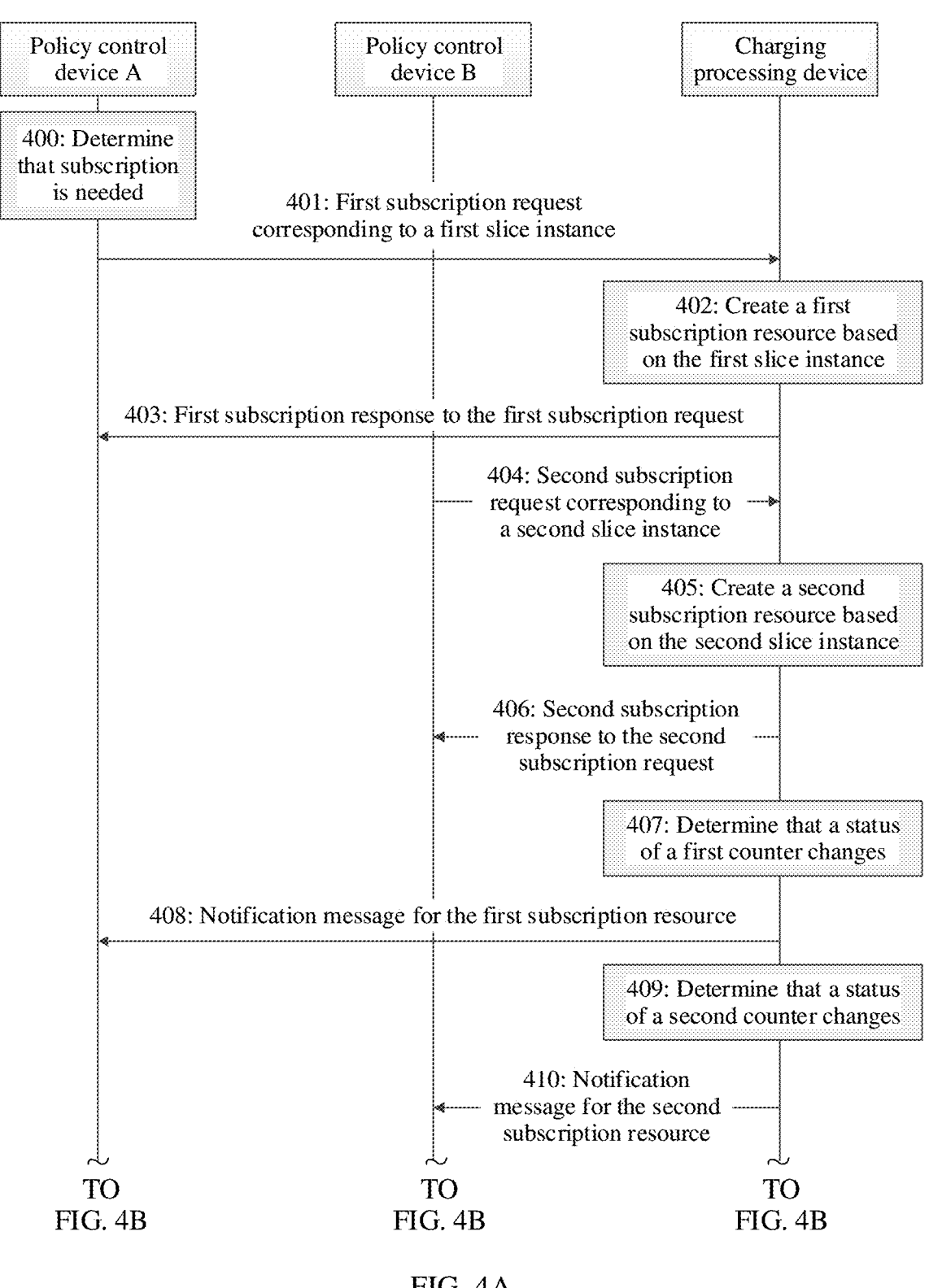

| PCF on a first slice instance | PCF on a second instance slice | CHF | |
|---|---|---|---|
| Sends a first subscription request corresponding to the first slice instance to the CHF | Sends a second subscription request corresponding to the second slice instance to the CHF | Creates a first subscription resource corresponding to the first slice instance and a second subscription resource corresponding to the second slice instance | Corresponds to FIG. 4A and FIG. 4B |

TABLE 1-continued

Figure 6A:
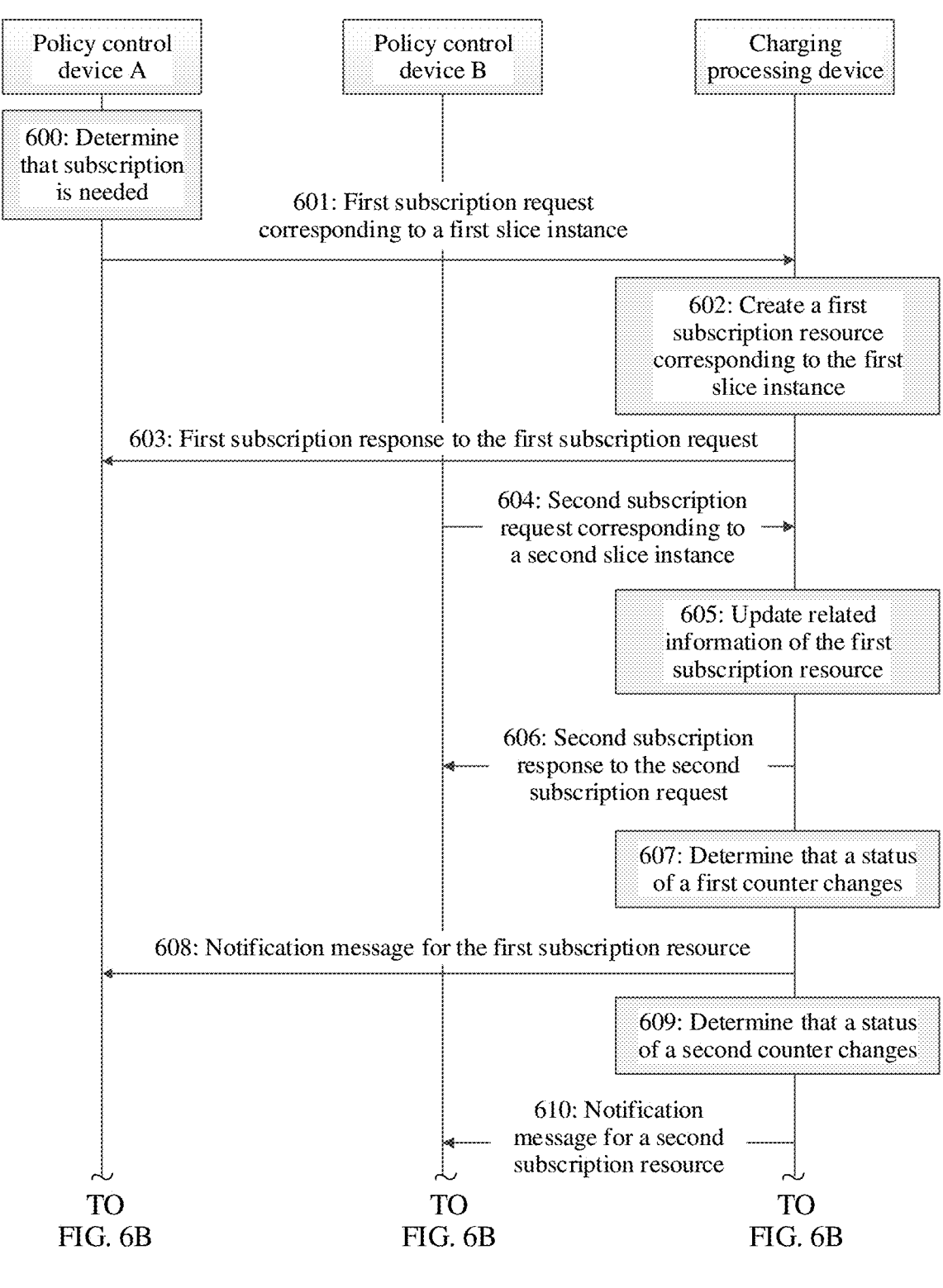

| PCF on a first slice instance | PCF on a second instance slice | CHF | |
|---|---|---|---|
| Sends a first subscription request corresponding to the first slice instance to the CHF | Sends a second subscription request corresponding to the second slice instance to the CHF | Creates a first subscription resource corresponding to the first slice instance, where the first subscription resource corresponding to the first slice instance also corresponds to the second slice instance, and content of the first subscription resource in the charging processing device is shared by the first slice instance and the second slice instance | Corresponds to FIG. 6A and FIG. 6B |

Figure 2B:
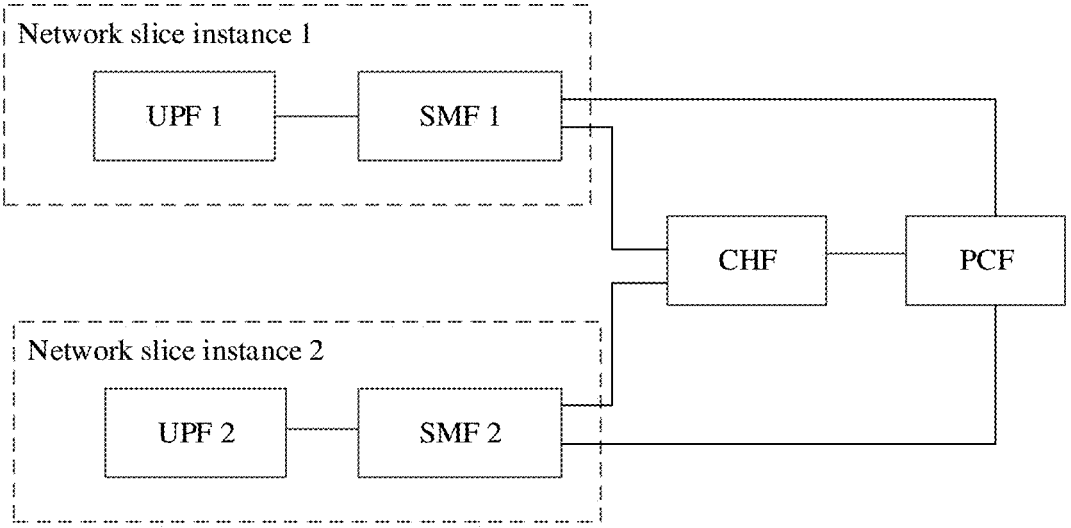
FIG. 2B is a schematic diagram of a system architecture in which a policy control device is deployed outside a network slice instance in the system architecture to which this application is applied.

FIG. 2B is a schematic diagram of a system architecture in which a policy control device is shared by a plurality of network slice instances (that is, the policy control device is deployed outside the network slice instance) in the system architecture to which this application is applied. The system architecture includes a network slice instance 1 (a slice instance 1 for short) and a network slice instance 2, and a charging processing device and a policy control device that are deployed outside the slice instance 1 and the slice instance 2. A user plane function (UPF) device and a session management function (SMF) device are deployed on each slice instance. In addition, there may be one or more policy control devices deployed outside the network slice instance. The policy control device may be communicatively connected to a session management function device on one or more slice instances. Different policy control devices deployed outside the network slice instance may be connected to session management function devices on a same slice instance, or session management function devices on different slice instances.

For implementing embodiments of this application by using the system architecture in FIG. 2B, refer to Table 1, FIG. 5, FIG. 7A-1 and FIG. 7A-2, and FIG. 7B.

TABLE 1

Figure 5:
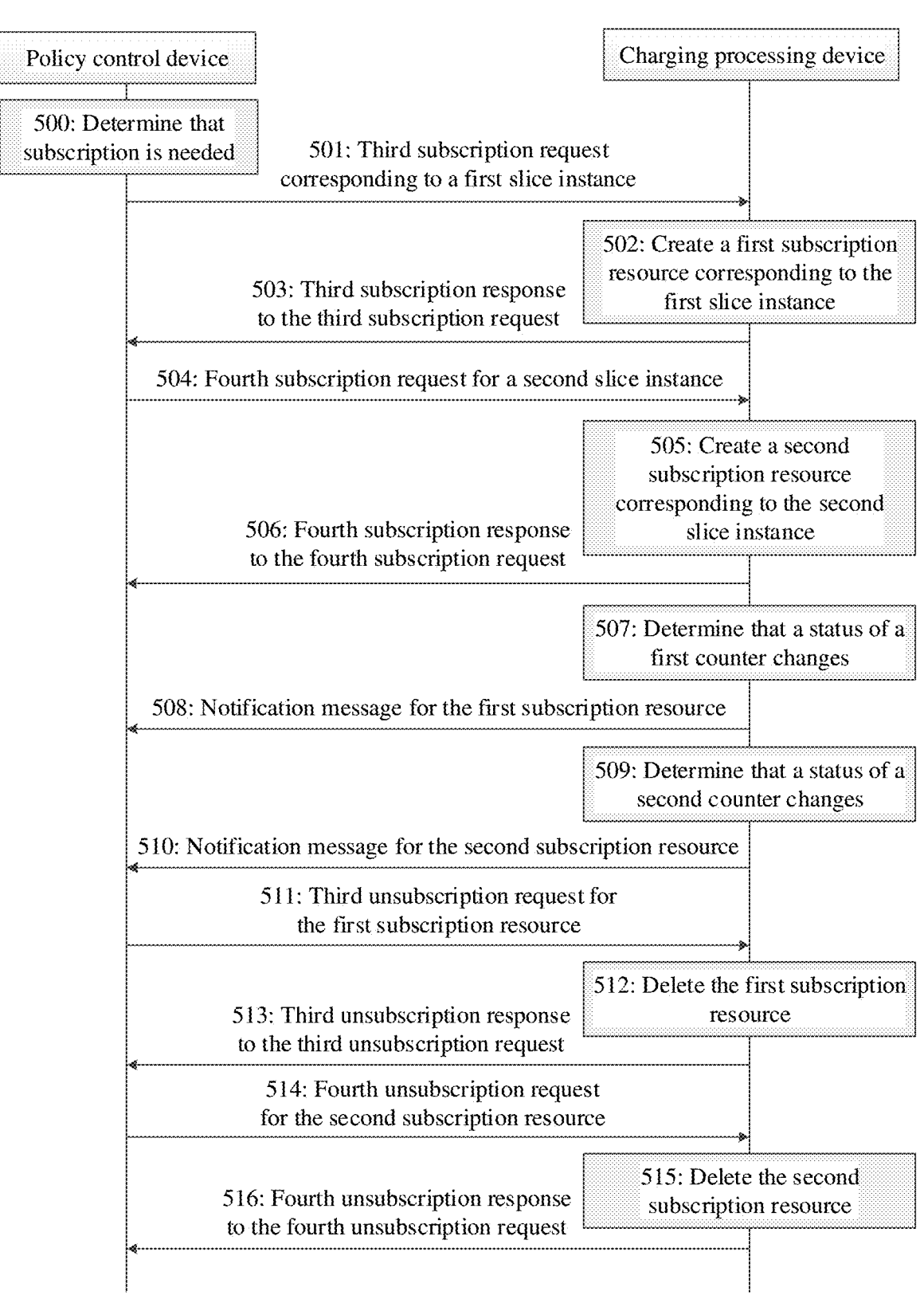
FIG. 5 is a flowchart of a counter information subscription method by a policy control device based on the system architecture in FIG. 2B according to an embodiment of this application.
Figures 1, 7A:
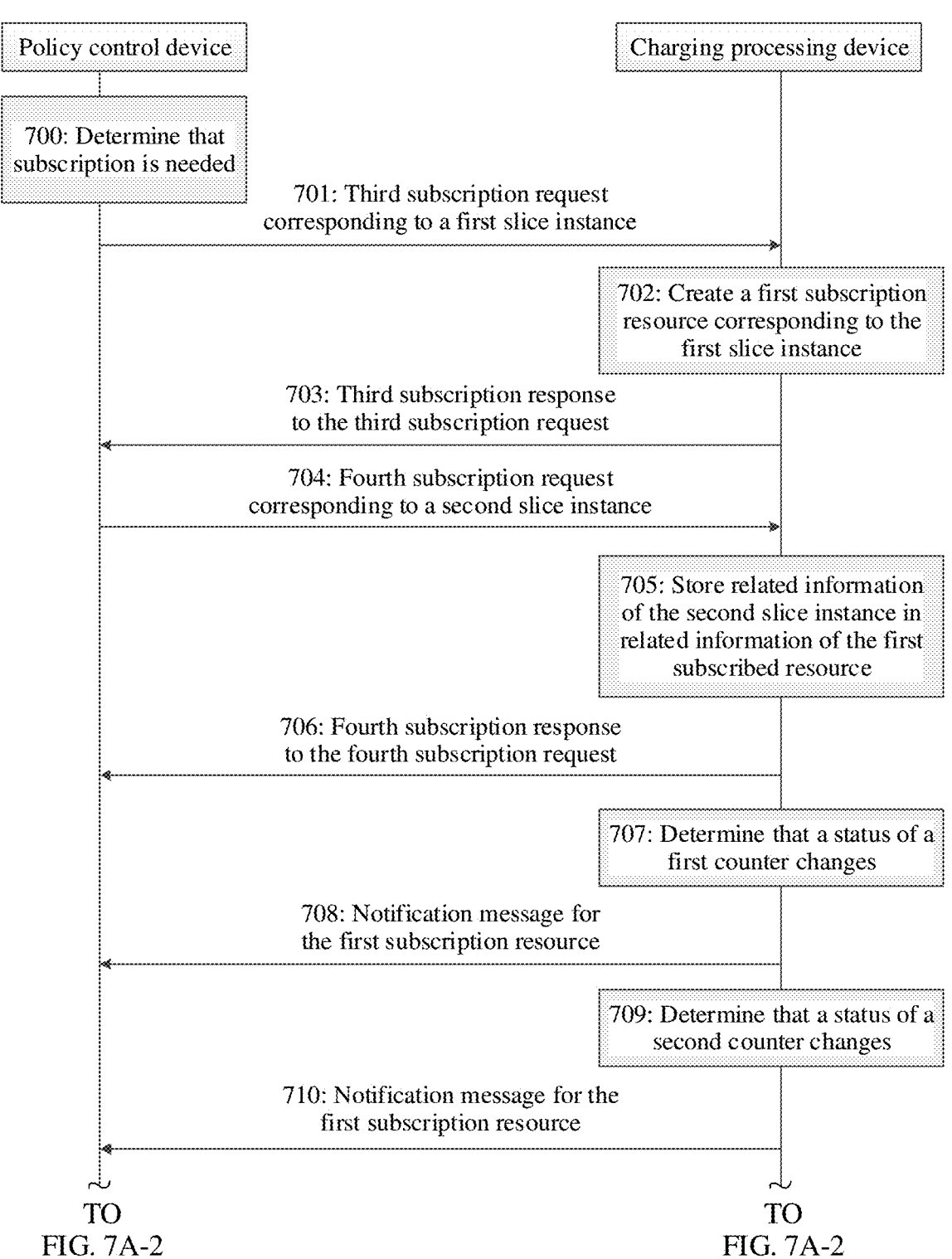
FIG. 7A-1 and FIG. 7A-2 are a flowchart of a counter information subscription method by a policy control device based on the system architecture in FIG. 2B according to an embodiment of this application.
Figures 2, 7A:
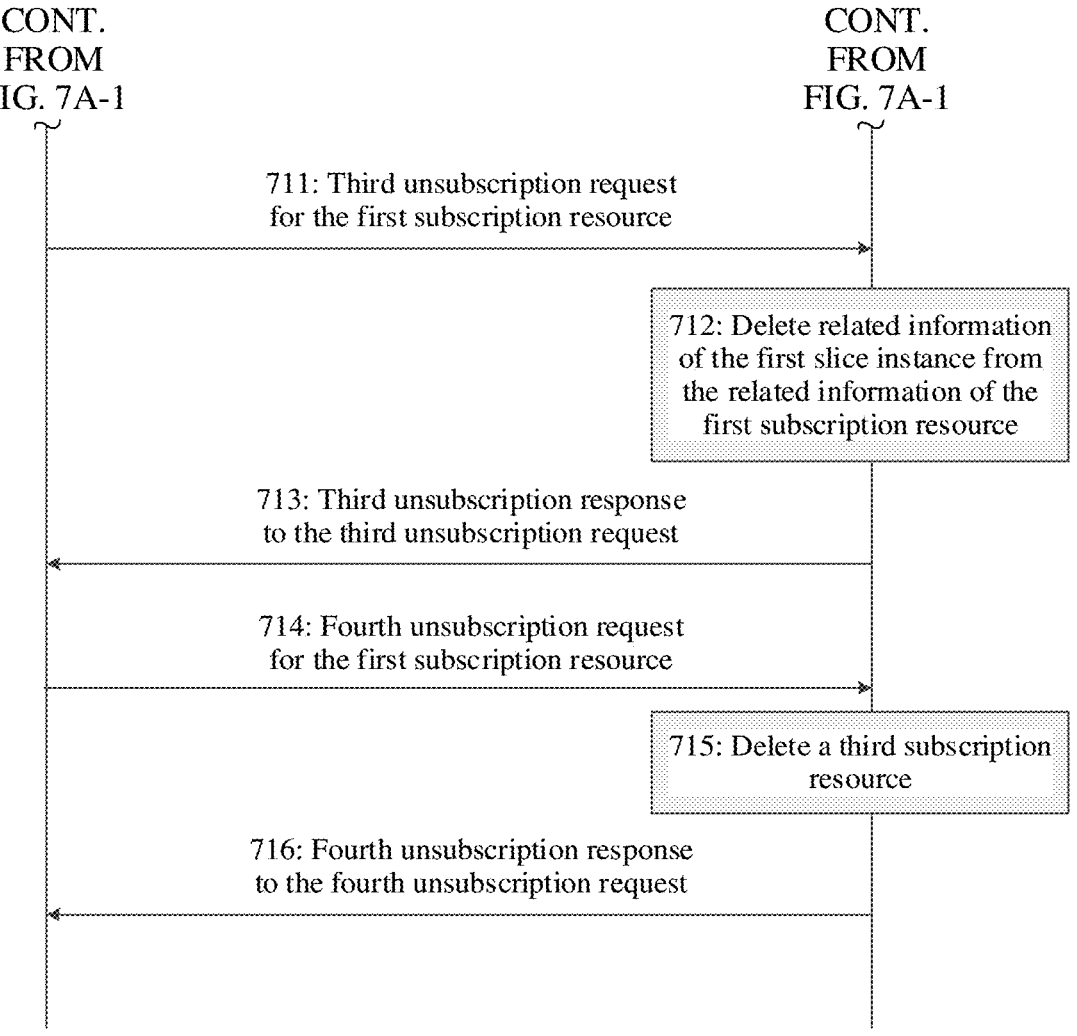

| PCF outside a first slice instance and a second slice instance | | CHF | |
|---|---|---|---|
| Sends a third subscription request corresponding to the first slice instance to the CHF | Sends a fourth subscription request corresponding to the second slice instance to the CHF | Creates a first subscription resource corresponding to the first slice instance and a second subscription resource corresponding to the second slice instance | Corresponds to FIG. 5 |
| Sends a third subscription request corresponding to the first slice instance to the CHF | Sends a fourth subscription request corresponding to the second slice instance to the CHF | Creates a first subscription resource corresponding to the first slice instance, where the first subscription resource corresponding to the first slice instance also corresponds to the second slice instance, and content | Corresponds to FIG. 7A-1 and FIG. 7A-2 |

US 12,574,462 B2

15

TABLE 1-continued

Figure 7B:
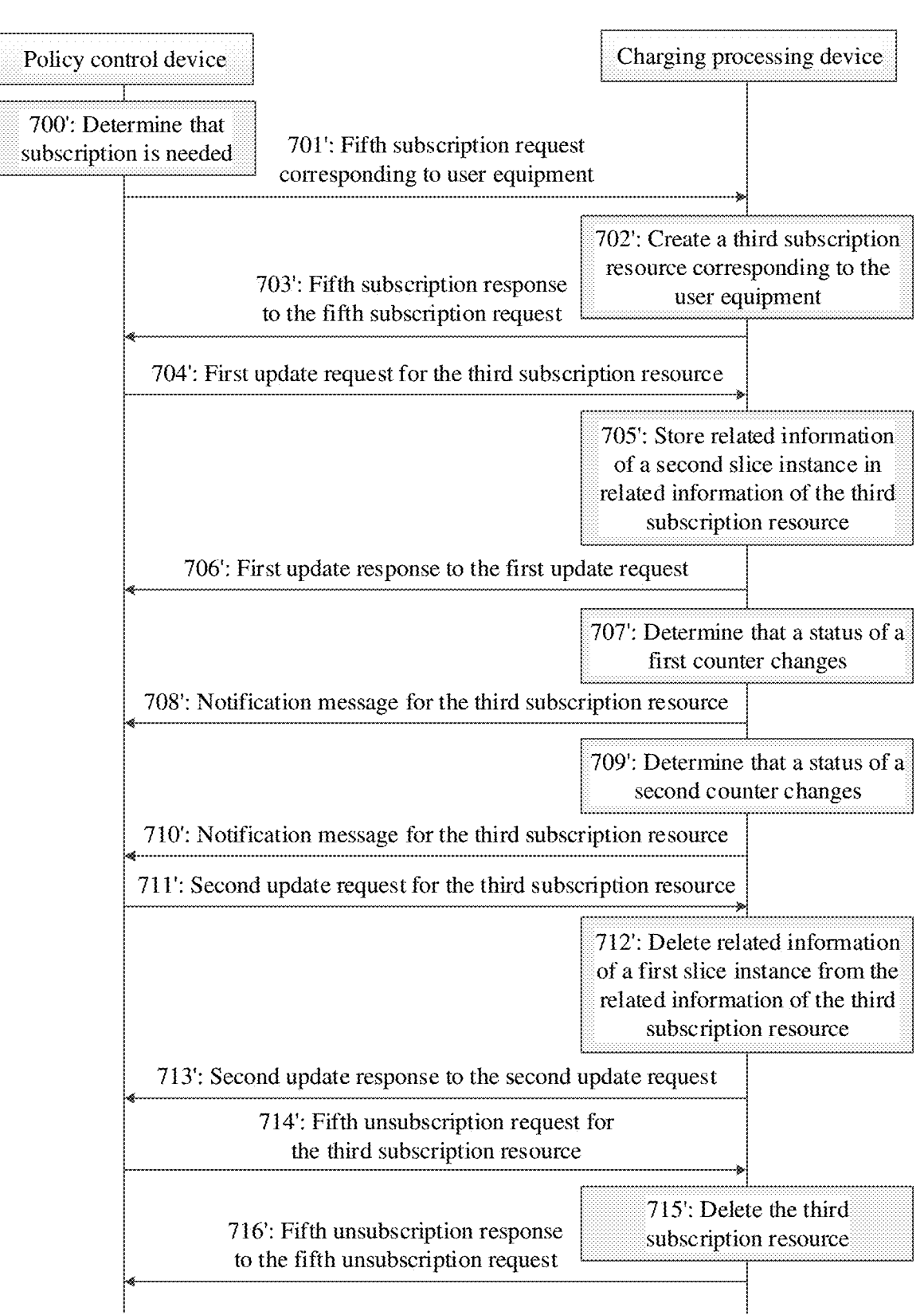
FIG. 7B is a flowchart of a counter information subscription method by a policy control device based on the system architecture in FIG. 2B according to an embodiment of this application.

| PCF outside a first slice instance and a second slice instance | | CHF | |
|---|---|---|---|
| | | of the first subscription resource in the charging processing device is shared by the first slice instance and the second slice instance | |
| Sends a fifth subscription request corresponding to user equipment to the CHF | First update request for a third subscription resource | Creates the fourth subscription resource corresponding to the user equipment, where the third subscription resource is shared by the first slice instance and the second slice instance, and the third subscription resource is shared by the first slice instance and the second slice instance in both the policy control device and the charging processing device | Corresponds to FIG. 7B |

In the system architecture shown in FIG. 1A to FIG. 2B, the charging processing device 101 is enabled to create a subscription resource related to a slice instance (for example, the subscription resource corresponding to the slice instance or the subscription resource corresponding to the user equipment), to send information about a slice instance-related counter to the policy control device. In this way, the policy control device may perform policy control on services deployed on different slice instances.

For ease of understanding embodiments of this application, the following explains some concepts.

A user service is a data connection service accessed or used by the user equipment 103 through a network device (for example, the session management function device 102 or a user plane device not shown in FIG. 1A). The user service may be a service in a protocol data unit session (PDU session). For example, one or more data flows corresponding to a rating group (RG) in a PDU session, or a data flow corresponding to an RG and a service identifier in a PDU session may be understood as the user service in embodiments of this application. In embodiments of this application, "a user service in a PDU session" or "a service in a PDU session" means a plurality of data flows corresponding to an RG in a PDU session, or may be a data flow corresponding to a service identifier in a plurality of data flows corresponding to an RG.

For of ease of description, in embodiments of this application, the user service is sometimes directly referred to as a "service".

A counter is used to trace user consumption in the CHF. The counter may be a counter of traffic used by a service, a counter of used duration, a counter of times of being invoked, or the like. The counter may also be referred to as a policy counter.

An identifier of the counter is used to identify the counter.

A status of the counter is a status of a recorded value, of the counter, relative to a usage limit. For example, if the usage limit is 50 MB, usage data 30 MB and usage data 60 MB respectively correspond to two statuses of the counter: being lower than the usage limit and higher than the usage limit. In this application, information about the counter includes one or more of the following information: a current status of the counter, a future status (including effective time of the status) of the counter, and expiration time of the status of the counter. If the counter corresponds to a network slice instance, the information about the counter may further include an identifier of the network slice instance corresponding to the counter.

In embodiments of this application, a consumption status of a user on a network slice instance (namely, a consumption amount of the user on a specific slice instance) is a slice-level counter for short. Values of counters (different slice-level counters) corresponding to the user on different slice instances are different, but the counters may have a same identifier of the counters. For example, if the counter is "accumulated traffic in a charging periodicity", and is identified by using a counter–1, and the user accesses two network slice instances S-NSSAI 1 and S-NSSAI 2 at the same time, a value of the counter–1 of the user corresponding to the S-NSSAI 1 is 30 M, and a value of the counter–1 of the user corresponding to the S-NSSAI 2 is 60 M. Therefore, correspondingly, statuses of the counter are also different.

In this application, a consumption status of the user on all network slice instances (namely, a sum of consumption amounts of the user on all network slice instances) is a user equipment-level counter (also referred to as a shared counter or a cross-slice-level counter) for short.

A network slice instance (NSI) is a logical network, and is used to meet a specific network feature or service requirement. One network slice instance may provide one or more services.

A subscription resource is a resource that is created by the charging processing device for the policy control device and that is used to obtain the information about the counter and a notification that is generated after the counter changes.

Subscription means that the policy control device requests the charging processing device to detect a change of the information about the counter, and notifies the changed information about the counter when the information about the counter changes.

All network slice instances in this application are network slice instances accessed by the user equipment. That the user equipment accesses the network slice instance specifically means that the user equipment is attached to the network slice instance or a PDU session of the user equipment is set up on the network slice instance.

In this application, an $X^{th}$ counter corresponding to a network slice instance is a set of counters corresponding to the network slice instance, and may be specifically one or more counters corresponding to the network slice instance.

In this application, a user identifier and an identifier of the user equipment have a same meaning, and may be identified by using an SUPI or a GSPI.

The following further describes examples of method procedures that can be implemented based on the system architecture shown in FIG. 1A. As shown in FIG. 3 to FIG. 7B, a charging processing device 101 in a method procedure corresponding to each figure corresponds to the charging processing device 101 in FIG. 1A, and a policy control device 104 corresponds to the policy control device 104 in FIG. 1A. Details are not described in subsequent descriptions of these method procedures.

FIG. 3A is a flowchart of a method in which a policy control device 104 subscribes to information about a slice instance-related counter according to an embodiment of this application. The flowchart shown in FIG. 3A is applicable to the two network architectures shown in FIG. 2A and FIG. 2B. The policy control device may send the first subscription request (or the second subscription request), the third subscription request (or the fourth subscription request), and the fifth subscription request (or the update request) shown in Table 1 and Table 2. FIG. 3A includes the following steps.

Step 302: The policy control device sends a subscription request, where the subscription request includes an identifier of a first slice instance and an identifier of user equipment. The subscription request is used to request to subscribe to information about a counter corresponding to the slice instance. In this embodiment, the subscription request is used to request to subscribe to the information about the counter corresponding to the first slice instance.

Before step 302 is performed, the policy control device receives the identifier of the first slice instance accessed by the user equipment, and determines, based on subscription information of the user equipment, that information about a first counter that is of the user equipment and that corresponds to the first slice instance needs to be subscribed to.

The subscription request is used to request to subscribe to the information about the counter corresponding to the slice instance. In this embodiment, the subscription request is used to request to subscribe to the information about the counter corresponding to the first slice instance. When the subscription request is a subscription request (for example, a first subscription request or a third subscription request) corresponding to the first slice instance, the subscription request may request to create, for the user equipment, a first subscription resource corresponding to the first slice instance, to subscribe to the information about the counter corresponding to the first slice instance. The identifier that is of the first slice instance and that is carried in the subscription request corresponding to the first slice instance is used to indicate that the first subscription resource is a subscription resource corresponding to the first slice instance, and the first subscription request further carries a notification address corresponding to the first slice instance.

When the subscription request is a subscription request (for example, a fifth subscription request) corresponding to the user equipment, the subscription request corresponding to the user equipment is used to request to create a fourth subscription resource for the user equipment. The identifier that is of the first slice instance and that is carried in the subscription request corresponding to the user equipment is an identifier of a slice instance corresponding to the first counter of the user equipment, the identifier of the first slice instance is used to indicate to subscribe to the information about the first counter that is of the user equipment and that corresponds to the first slice instance, and the first subscription request further carries a notification address corresponding to the user equipment. First information of the first counter corresponding to the first slice instance includes a first status of the first counter and the identifier of the corresponding first slice instance.

Step 304: The policy control device receives a subscription response, where the subscription response includes the first information of the first counter corresponding to the first slice instance and a subscription identifier.

If the subscription request is the fifth subscription request, the first information of the first counter corresponding to the first slice instance includes the first status of the first counter and the identifier of the corresponding first slice instance. If the subscription request is the first subscription request or the third subscription request, the first information of the first counter corresponding to the first slice instance includes the first status of the first counter, and does not include the identifier of the first slice instance.

Further, after the policy control device receives the subscription response, the policy control device may further receive a first notification message, where the first notification message carries the identifier of the first slice instance, second information of the first counter, or a subscription termination indication of the first subscription. The policy control device generates an update control policy of the user equipment based on the second information of the first counter, or the policy control device requests, based on the subscription termination indication of the first subscription, to delete the first subscription resource corresponding to the first slice instance.

Further, the policy control device determines that the first subscription resource corresponding to the first slice instance needs to be unsubscribed from; and sends an unsubscription request for the first subscription resource to a charging processing device.

However, in the network architecture based on FIG. 2B, when the subscription request is the fifth subscription request, the policy control device receives a notification message sent by the charging processing device by using the notification address corresponding to the user equipment, where the notification message carries the second information of the first counter, and the second information includes a second status of the first counter and the identifier of the corresponding first slice instance. The policy control device generates the update control policy of the user equipment based on the second information of the first counter.

Further, if the subscription resource is the third subscription resource, the policy control device determines that information about a second counter corresponding to a second slice instance needs to be subscribes to. The policy control device sends a first update request for the fourth subscription resource to the charging processing device, where the first update request includes a third subscription identifier, an identifier of the second counter, and an identifier of the second slice instance corresponding to the second counter.

According to this embodiment of this application, the policy control device may subscribe to the information about the counter corresponding to the slice instance. In this way, the counter is subscribed to in the network architecture for the slice instance.

FIG. 3B is a flowchart of a method in which a policy control device 104 subscribes to information about a slice instance-related counter for user equipment according to an embodiment of this application. The flowchart shown in FIG. 3B is applicable to the two network architectures shown in FIG. 2A and FIG. 2B. In the embodiment provided in FIG. 3B, the policy control device may perform update based on an existing subscription resource of the user equipment (that is, the subscription resource may not be related to a slice instance), to subscribe to the information about the slice instance-related counter. FIG. 3B includes the following steps.

Step 352: The policy control device sends a first update request for a subscription resource to a charging processing device, where the first update request carries a subscription identifier, an identifier of a first slice instance, and an identifier of a first counter that the first slice instance needs to subscribe to.

Before step 352 is performed, the policy control device determines that information about the first counter corresponding to the first slice instance needs to be subscribed to, and determines that the user equipment already has the subscription resource.

After receiving the first update request, the charging processing device stores the identifier of the first counter and the identifier of the first slice instance in related information of the subscription resource.

Step 354: The policy control device receives a first update response returned by the charging processing device.

Further, the policy control device further sends a second update request for the subscription resource to the charging processing device, where the update request carries the identifier of the first counter and the identifier of the first slice instance most corresponding to the first counter, and the update request is used to remove subscription to a counter corresponding to a second slice instance; and the charging processing device updates related information of a first subscription resource based on the second update request.

According to this embodiment of this application, when determining that the information about the counter corresponding to the slice instance needs to be subscribed to, and determining that the user equipment already has the subscription resource, the policy control device may store, by using the update request, the identifier of the counter to be subscribed to and the identifier of the slice instance corresponding to the counter in the related information of the existing subscription resource, to complete subscription to the counter corresponding to the slice instance.

FIG. 4A and FIG. 4B are a flowchart of a method in which a policy control device 104 obtains and subscribes to information about a slice instance-related counter for user equipment according to an embodiment of this application. A method procedure corresponding to FIG. 4A and FIG. 4B corresponds to the system architecture in FIG. 2A. The policy control device 104 is deployed on a slice instance. The policy control device 104 sends a subscription request, to indicate a charging processing device to create a first subscription resource corresponding to a first slice instance. The charging processing device creates different subscription resources for different slice instances accessed by the user equipment. The policy control device may obtain, from another network device (for example, a UDR), a counter list (which may include a slice-level counter and a cross-slice-level counter) corresponding to the slice instance accessed by the user equipment, or configure, on the policy control device, a counter corresponding to the slice instance accessed by the user equipment. The method procedure mainly includes the following steps.

400: A policy control device A determines that a status of a first counter that is of the user and that corresponds to the first slice instance needs to be subscribed to.

The policy control device A receives an identifier of the first slice instance accessed by the user equipment, and determines, based on subscription information of the user, that the status of the first counter corresponding to the first slice instance needs to be obtained and subscribed to. Specifically, the policy control device A determines, based on the subscription information of the user, that a policy decision of the user depends on the status of the first counter that is of the user and that corresponds to the first slice instance, to determine that the status of the first counter corresponding to the first slice instance needs to be subscribed to.

That the policy control device A receives the identifier of the first slice instance accessed by the user equipment may be as follows: The policy control device A receives a protocol data unit session policy request that is of the user equipment on the first slice instance accessed by the user equipment and that is sent by a session management function device, and obtains, from the policy request, the identifier of the first slice instance accessed by the user equipment. For example, when the user equipment requests the session management function device A 102 on the accessed first slice instance to create a PDU session, the user equipment may send the policy request to the policy control device A. The policy request sent by the session management function device 102 to the policy control device A may carry a user identifier, information about the PDU session (for example, a type of the PDU session), the identifier of the first slice instance, and the like.

401: The policy control device A sends a first subscription request corresponding to the first slice instance to the charging processing device.

The first subscription request is used to request to create, for the user equipment, the first subscription resource corresponding to the first slice instance. The first subscription request carries an identifier of the user equipment (SUPI), the identifier of the first slice instance (slice1), and a notification address corresponding to the first slice instance (NotifyURL1). Optionally, the first subscription request may further carry an identifier of the counter (counterID1) corresponding to the first slice instance or an identifier of the policy control device A. The SUPI may be a user identifier, or may be an identifier of user equipment. To describe the method, the SUPI is collectively referred to as the identifier of user equipment in this application. The identifier of the first slice instance is used to indicate that the first subscription resource is a subscription resource corresponding to the first slice instance.

For the subscription request of the first slice instance, refer to the following example:

```
Request:
{
"UserID":"SUPI",
"SliceID":"S-NSSAI1",
"NotifyURL":"XXX",
"CounterIDs":{
"CounterID":"1",
"CounterID":"2"
}
}
```

A value of the parameter sliceID is the identifier of the first slice instance, a value of the parameter counterID is the identifier of the first counter that is of the user and that corresponds to the first slice instance, and a value of the parameter NotifyURL is the notification address corresponding to the first slice instance. The notification address corresponding to the first slice instance is used by the charging processing device to notify the policy control device A of the information about the counter corresponding to the first slice instance accessed by the user equipment, for example, a change of status information of the counter.

In an optional manner, the first subscription request may alternatively not carry the identifier of the first counter that needs to be subscribed to and that corresponds to the first slice instance. After receiving the first subscription request, the charging processing device determines the identifier of the first counter that is of the user (or the user equipment) and that corresponds to the first slice instance.

Step 402: The charging processing device creates, for the user equipment, the first subscription resource corresponding to the first slice instance, allocates a first subscription identifier Res-1 to the first subscription resource, and stores related information of the first subscription resource.

Specifically, after receiving the first subscription request, the charging processing device creates, for the user equipment based on the identifier of the first slice instance in the first subscription request, the first subscription resource corresponding to the first slice instance, and allocates the first subscription identifier Res-1 to the first subscription resource, where the first subscription identifier is used to identify the first subscription resource.

The first subscription resource is a subscription resource that corresponds to the first slice instance and that the policy control device A requests the charging processing device 101 to create for the user equipment. The first subscription resource corresponding to the first slice instance may be a first subscription resource of the first slice instance accessed by the user equipment. The first subscription resource is used by the policy control device A to obtain current information (for example, a current status) and an information change (for example, a status change) of the counter that is of the user equipment and that is related to the first slice instance. In this embodiment of this application, the slice instance-related counter may alternatively be a counter corresponding to the slice instance.

The related information of the first subscription resource includes related information of the first slice instance. The related information of the first slice instance includes the identifier of the first slice instance, the notification address corresponding to the first slice instance, and the identifier of the first counter corresponding to the first slice instance. There is a correspondence between the stored related information of the first slice instance. The related information of the first subscription resource further includes the first subscription identifier and the identifier of the user equipment. The first subscription resource is used to manage subscription to the policy control device A. After the status of the first counter changes, the charging processing device may send, to the policy control device (for example, the policy control device A) of the first slice instance, the information (for example, the status of the first counter) about the first counter whose status changes.

The related information of the first subscription resource is shown in Table 3:

TABLE 3

| SUPI | ResID | SliceInfo | NotifyURL | CounterIDs |
|------|-------|-----------|-----------|------------|
| 13XXXXXX | 1 | Slice1 | XXX1 | C1 C2 |

Step 403: The charging processing device returns a subscription response to the first subscription request (a first subscription response for short) to the policy control device A, where the first subscription response includes first information of the first counter corresponding to the first slice instance and the first subscription identifier.

The first information includes a current status of the first counter.

Further, after receiving a first status of the first counter, the policy control device A may generate a control policy for the PDU session of the user equipment based on the first status of the first counter, and send the control policy to the session management function device.

Steps 404 to 406: A policy control device B sends a second subscription request corresponding to a second slice instance to the charging processing device. The charging processing device creates, for the user equipment, a second subscription resource corresponding to the second slice instance (a second subscription resource for short), allocates a subscription identifier Res-2 corresponding to the second slice instance, and returns a subscription response to the second subscription request (a second subscription response for short) to the policy control device B.

For descriptions of steps 404 to 406, refer to the detailed descriptions of steps 401 to 403. Details are not described herein again in this embodiment of this application.

407: The charging processing device determines that a notification message for the first subscription resource needs to be sent to the policy control device A, and generates the notification message for the first subscription resource, where the notification message for the first subscription resource may be a first notification message or a second notification message.

Specifically, when determining that the information about the first counter (counter1) changes, the charging processing device determines that the notification message for the first subscription resource needs to be sent. A notification message sent because the information about the counter corresponding to the first slice instance changes is referred to as a first notification message. Herein, that the information about the first counter changes mainly means that the status of the first counter changes, to be specific, the charging processing device determines that the first counter changes from the first status to a second status. The charging processing device generates the first notification message, where the first notification message includes the identifier of the first slice instance and second information (namely, the second status) of the first counter.

Optionally, that the charging processing device determines that the notification message for the first subscription resource needs to be sent to the charging processing device may also be that the charging processing device determines that the first subscription needs to be terminated, and further determines that the notification message for the first subscription resource needs to be sent. A notification message sent because the first subscription corresponding to the first slice instance needs to be terminated is referred to as a second notification message. The charging processing device may determine, in a plurality of cases, that the first subscription needs to be terminated. For example, a user account status changes, user subscription information changes, or the first subscription resource is identified as a to-be-cleaned resource. The charging processing device generates the second notification message, where the second notification message includes the identifier of the first slice instance and a subscription termination indication of the first subscription. Further, the charging processing device deletes the first subscription resource based on a success response to the second notification message.

Further, the charging processing device determines, based on stored subscription information, the notification address corresponding to the first slice instance as an address for sending the first notification message.

Step 408: The charging processing device sends the notification message (for example, the first notification message or the second notification message) for the first subscription resource to the policy control device A.

Specifically, the charging processing device sends the first notification message by using the notification address corresponding to the first slice instance.

For the first notification message, refer to the following example:

```
Notify Request:
{
"UserID":"SUPI",
"SliceID":"S-NSSAI1",
"CounterInfo":{
"CounterID":"1",
"CounterStatus":"2"
}
}
```

A value of "UserID" is the user identifier (SUPI), and a value of "SliceID" is the identifier of the slice instance. A value of "CounterID" is the identifier of the counter, and a value of "Status" is the status of the counter.

Further, after receiving the first notification message, the policy control device A may generate an update control policy for the PDU session of the user equipment based on the second information (namely, the second status) that is of the first counter and that is carried in the first notification message, and send the update control policy to the session management function device.

Further, after receiving the second notification message, the policy control device A may delete, based on the subscription termination indication that is of the first subscription and that is carried in the second notification message, the first subscription resource corresponding to the first slice instance.

Steps 409 and 410: The charging processing device determines that a notification message for the second subscription resource needs to be sent to the policy control device B, generates the notification message for the second subscription resource, and sends the notification message for the second subscription resource to the policy control device B, where the notification message for the second subscription resource may be a third notification message or a fourth notification message.

Specifically, when determining that information (a status herein) about a second counter (counter2) changes, the charging processing device determines that the notification message (the third notification message) needs to be sent. The charging processing device generates the third notification message, where the third notification message includes an identifier of the second slice instance and second information (namely, a second status) of the second counter.

After receiving the third notification message, the policy control device B generates an update control policy for the PDU session of the UE based on the second information (namely, the second status) that is of the second counter and that is carried in the third notification message, and sends the update control policy to the session management function device.

Optionally, that the charging processing device determines that the notification message (the fourth notification message) of the second subscription resource needs to be sent to the charging processing device, specifically, may also be that the charging processing device determines that the second subscription needs to be terminated, and further determines that the fourth notification message needs to be sent. The charging processing device generates the fourth notification message, where the fourth notification message includes an identifier of the second slice instance and a subscription termination indication of the second subscription.

After receiving the fourth notification message, the policy control device B deletes, based on the subscription termination indication that is of the second subscription and that is carried in the fourth notification message, the second subscription resource corresponding to the second slice instance.

For specific descriptions of steps 409 and 410, refer to steps 407 and 408. Details are not described herein again in this embodiment of this application.

Step 411: The policy control device A determines that the first subscription resource corresponding to the first slice instance needs to be unsubscribed from, and sends an unsubscription request for the first subscription resource to the charging processing device, where the first subscription corresponds to the first subscription request, and the first subscription also corresponds to the first subscription resource. Subscription indicates an action, a process, or a result of requesting to subscribe to the information about the counter by the policy control device A.

A first unsubscription request carries the first subscription identifier Res-1. Optionally, the first unsubscription request further carries the identifier of the first slice instance.

When the policy control device A determines that the policy decision of the user does not need the status of the first counter (where for example, the policy control device A does not need to generate the control policy of the user), the policy control device A determines that the first subscription resource corresponding to the first slice instance needs to be unsubscribed from. For example, the policy control device A determines that there is no PDU session set up for the user equipment on the first slice instance (where all PDU sessions set up for the user equipment on the first slice instance are released), or that there is a PDU session set up for the user equipment on the slice instance, but the PDU session set up for the user equipment does not need to subscribe to the status of counter1 based on subscription data or an operator policy.

Step 412: After receiving the first unsubscription request, the charging processing device deletes the first subscription resource.

Step 413: The charging processing device returns a first unsubscription response to the policy control device A, where the first unsubscription response is a first unsubscription response to the first unsubscription request.

In steps 414 to 416, unsubscription performed by the policy control device B for the second subscription resource corresponding to the second slice instance (which is also unsubscription performed based on the second subscription resource corresponding to the second subscription request) is described. For specific descriptions, refer to steps 411 to 413. Details are not described herein again in this embodiment of this application.

In an optional manner, the first subscription request in step 401 may further carry an NFConsumerID. For the NFConsumerID identifier carried in the first subscription request, refer to the following example:

```
Request:
{
"UserID":"SUPI",
"NFConsumerID":"pcf1",
"NotifyURL":"XXX",
"CounterIDs":{
"CounterID":"1",
"CounterID":"2"
}
}
```

The field NFConsumerID indicates the identifier of the policy control device A deployed on the slice instance.

In this embodiment, the subscription request may further include the identifier of the policy control device. The identifier of the policy control device is used to indicate the charging processing device to determine subscription requests as different subscription requests when the charging processing device receives the subscription requests that are of the user equipment and that are sent by different policy control devices. After receiving the request that carries the identifier of the user equipment and the identifier of the policy control device, the charging processing device determines, based on the identifier of the user equipment and the identifier of the policy control device, that a subscription resource that is of the user equipment and that corresponds to the policy control device does not exist, and creates a new subscription resource for the user equipment; or determines, based on the identifier of the user equipment and the identifier of the policy control device, that a subscription resource that is of the user equipment and that corresponds to the policy control device does not exist, and updates related information of an existing subscription resource of the user equipment (that is, add, to stored information of the existing subscription resource, information corresponding to the subscription request of the policy control device, where the information includes the information about the slice instance, the counter, and the notification address). In this method, the charging processing device may consider subscription requests from different policy control devices for same user equipment as new subscription requests and perform correct processing, to avoid rejection of repeated subscription requests.

According to this embodiment of this application, the policy control device deployed on the slice instance sends the subscription request corresponding to the slice instance to the charging processing device, and the charging processing device creates, for the user equipment, the subscription resource corresponding to the slice instance. In addition, after the status of the counter changes, the charging processing device notifies the policy control device deployed on the slice instance of the status of the counter. Therefore, the policy control device may generate a control policy based on the information about the counter, so that the policy control device can perform policy control on use of each service of the user equipment in a scenario in which the network slice instance is used.

In an optional manner, the first subscription request in step 401 may further carry an NFConsumerID identifier, and indicate, in the field CounterIDs, an identifier, of a slice instance, corresponding to each counterID. For the NFConsumerID identifier carried in the first subscription request, refer to the following example:

```
Request:
{
"UserID":"SUPI",
"NFConsumerID":"pcf1",
"NotifyURL":"XXX",
"CounterIDs":{
"CounterID":"1",
"SliceID":"S-NSSAI1",
},
"CounterIDs":{
"CounterID":"2"
}
}
```

The field NFConsumerID indicates the identifier of the policy control device A deployed on the slice instance. The foregoing example indicates that the counter whose counter identifier is 1 is the slice-level counter corresponding to the first slice instance indicated by the identifier of the slice instance S-NSSAI 1. The counter whose counter identifier is 2 is the cross-slice counter. In other words, the counter whose counter identifier is 2 may correspond to all slice instances accessed by the user equipment.

FIG. 5 is a flowchart of a method in which a policy control device 104 obtains and subscribes to information about a slice instance-related counter for user equipment according to an embodiment of this application. A method procedure corresponding to FIG. 5 corresponds to the system architecture in FIG. 2B. The policy control device 104 is deployed outside a slice instance. The policy control device 104 sends a subscription request, to indicate a charging processing device to create a first subscription resource corresponding to a first slice instance. The charging processing device creates different subscription resources for different slice instances accessed by the user equipment. The policy control device may obtain, from another network device (for example, a UDR), a counter list (which may include a slice-level counter and a cross-slice-level counter) corresponding to the slice instance accessed by the user equipment, or configure, on the policy control device, a counter corresponding to the slice instance accessed by the user equipment. The method procedure mainly includes the following steps.

Steps 500 to 503: The policy control device determines that a status of a first counter that is of the user and that corresponds to the first slice instance needs to be subscribed to, and sends a third subscription request corresponding to the first slice instance to the charging processing device. The charging processing device creates, for the user equipment, the first subscription resource corresponding to the first slice instance, and sends a subscription response to the third subscription request (a third subscription response for short) to the policy control device.

The policy control device is deployed outside the first slice instance. For detailed descriptions of steps 500 to 503, refer to the detailed descriptions of steps 400 to 403. Details are not described herein again in this embodiment of this application.

Steps 504 to 506: The policy control device sends a fourth subscription request corresponding to a second slice instance to the charging processing device. The charging processing device creates, for the user equipment, a second subscription resource corresponding to the second slice instance, and sends a subscription response to the fourth subscription request (a fourth subscription response for short) to the policy control device.

For descriptions of steps 504 to 506, refer to the detailed descriptions of steps 404 to 403. Details are not described herein again in this embodiment of this application.

In this step, before performing step 504, the policy control device further needs to determine that a status of a second counter that is of the user and that corresponds to the second slice instance needs to be subscribed to. For descriptions that the policy control device determines that the status of the second counter that is of the user and that corresponds to the second slice instance needs to be subscribed to, refer to the descriptions of step 400. Details are not described herein again in this embodiment of this application.

Steps 507 and 508: The charging processing device determines that a notification message for the first subscription resource needs to be sent to the policy control device, and generates the notification message for the first subscription resource. The charging processing device sends the notification message (for example, a first notification message or a second notification message) for the first subscription resource to the policy control device.

For descriptions of steps 507 and 508, refer to the detailed descriptions of steps 407 and 408. Details are not described herein again in this embodiment of this application.

Steps 509 and 510: The charging processing device determines that a notification message for the second subscription resource needs to be sent to the policy control device, and generates the notification message for the second subscription resource. The charging processing device sends the notification message (for example, a third notification message or a fourth notification message) for the second subscription resource to the policy control device.

For descriptions of steps 509 and 510, refer to the detailed descriptions of 407 and 408. Details are not described herein again in this embodiment of this application.

Steps 511 to 513: The policy control device determines that the first subscription resource corresponding to the first slice instance needs to be unsubscribed from, and sends a third unsubscription request for the first subscription resource (a third unsubscription request for short) to the charging processing device. After receiving the third unsubscription request, the charging processing device deletes the first subscription resource, and sends a third unsubscription response to the policy control device. The third subscription resource corresponds to the first subscription resource requested to be created by the third subscription request.

For descriptions of steps 511 to 513, refer to the detailed descriptions of steps 411 to 413. Details are not described herein again in this embodiment of this application.

Steps 514 to 516: The policy control device determines that the second subscription resource corresponding to the second slice instance needs to be unsubscribed from, and sends a fourth unsubscription request for the first subscription resource (a fourth unsubscription request for short) to the charging processing device. After receiving the fourth unsubscription request, the charging processing device deletes the second subscription resource, and sends a second unsubscription response to the policy control device.

For descriptions of steps 514 to 516, refer to the detailed descriptions of steps 413 to 416. Details are not described herein again in this embodiment of this application.

In an optional manner, with reference to the embodiments in FIG. 4A and FIG. 4B and FIG. 5, the policy control device may further send a subscription resource update request to the charging processing device, where the subscription resource update request may carry a subscription identifier, and an identifier of a subscribed counter or an identifier of an unsubscribed counter that needs to be added. After receiving the subscription resource update request, the charging processing device updates related information of the subscription resource based on information carried in the subscription resource update request.

For example, the subscription resource update request may be a resource subscription request for adding the subscribed counter, and the resource subscription request for adding the subscribed counter may carry the identifier of the counter, the created subscription identifier, the identifier of the slice instance, and/or an identifier of a policy control device. After receiving the resource subscription request for adding the subscribed counter, the charging processing device adds, based on the subscription identifier, the identifier of the counter to related information of the corresponding slice instance.

The subscription resource update request may be an update request for unsubscribing from the counter, and the update request for unsubscribing from the counter may carry the identifier of the counter, the created subscription identifier, the identifier of the slice instance, and/or an identifier of the policy control device. After receiving the unsubscription request, the charging processing device deletes, based on the subscription identifier, the identifier of the counter from the related information of the corresponding slice instance.

In this embodiment, the subscription request may further include the identifier of the policy control device. The identifier of the policy control device is used to indicate the charging processing device to determine subscription requests as different subscription requests when the charging processing device receives the subscription requests that are of the user equipment and that are sent by different policy control devices. After receiving the request that carries the identifier of the user equipment and the identifier of the policy control device, the charging processing device determines, based on the identifier of the user equipment and the identifier of the policy control device, that a subscription resource that is of the user equipment and that corresponds to the policy control device does not exist, and creates a new subscription resource for the user equipment; or determines, based on the identifier of the user equipment and the identifier of the policy control device, that a subscription resource that is of the user equipment and that corresponds to the policy control device does not exist, and updates related information of an existing subscription resource of the user equipment (that is, add, to stored information of the existing subscription resource, information corresponding to the subscription request of the policy control device, where the information includes the information about the slice instance, the counter, and the notification address). In this method, the charging processing device may consider subscription requests from different policy control devices for same user equipment as new subscription requests and perform correct processing, to avoid rejection of repeated subscription requests.

According to this embodiment of this application, the policy control device deployed outside each slice instance sends the subscription request corresponding to the slice instance to the charging processing device, so that the subscription resource created by the charging processing device for the user equipment is the subscription resource corresponding to the slice instance of the user equipment. In addition, after the status of the counter changes, the charging processing device notifies the policy control device deployed outside the slice instance of the status of the counter. Therefore, the policy control device may generate a control policy based on the information about the counter, so that the policy control device can perform policy control on use of each service of the user equipment in a scenario in which the network slice instance is used.

FIG. 6A and FIG. 6B are a flowchart of a method in which a policy control device 104 obtains and subscribes to a slice instance-related counter for user equipment according to an embodiment of this application. A method procedure corresponding to FIG. 6A and FIG. 6B corresponds to the system architecture in FIG. 2A. The policy control device 104 is deployed on a slice instance. The policy control device 104 sends a subscription request, to indicate a charging processing device to create a subscription resource corresponding to a first slice instance. A difference from the procedure corresponding to FIG. 4A and FIG. 4B is that the charging processing device creates a shared subscription resource for subscription requests corresponding to different slice instances. The subscription resource is shared by a plurality of slice instances in a charging system, and the policy control device does not perceive that the subscription resource is the shared subscription resource. The method procedure mainly includes the following steps.

Step 600 to 603: A policy control device A determines that a status of a first counter that is of the user and that corresponds to the first slice instance needs to be subscribed to, and sends a first subscription request corresponding to the first slice instance to the charging processing device. The charging processing device creates, for the user equipment, a first subscription resource corresponding to the first slice instance, and sends a subscription response for the first subscription request (a first subscription response for short) to the policy control device A.

For detailed descriptions of steps 600 to 603, refer to the detailed descriptions of steps 400 to 403. Details are not described herein again in this embodiment of this application.

Related information that is of the first subscription resource and that is stored by the charging processing device includes a correspondence between an identifier of the first slice instance, an identifier of the counter corresponding to the first slice instance, and a notification address corresponding to the first slice instance, as shown in Table 3:

TABLE 3

| SUPI | ResID | SliceInfo | NotifyURL | CounterIDs |
|---|---|---|---|---|
| 13XXXXXX | 1 | Slice1 | XXX1 | C1 |
| | | | | C2 |

Step 604: A policy control device B sends a second subscription request corresponding to a second slice instance to the charging processing device.

The policy control device B determines that information about a second counter corresponding to the second slice instance needs to be subscribed to, and sends the second subscription request corresponding to the second slice instance to the charging processing device. The second subscription request corresponding to the second slice instance carries an identifier of the second slice instance and an identifier of the user equipment. For specific descriptions of step 604, refer to the detailed descriptions of step 404. Details are not described herein again in this embodiment of this application.

Step 605: The charging processing device determines, based on the identifier of the user equipment, that the first subscription resource of the user equipment exists, and updates the related information of the first subscription resource.

The charging processing device determines, based on a user identifier (or the identifier of the user equipment) carried in the second subscription request, that the first subscription resource of the user equipment exists (that is, the first subscription resource has been created for the user or the user equipment). That the charging processing device updates the related information of the first subscription resource may be as follows: The charging processing device adds, to the related information of the first subscription resource, related information that is of the second slice instance and that is carried in the second subscription request. The related information of the second slice instance includes the identifier of the second slice instance, a notification address corresponding to the second slice instance, and/or an identifier of the second counter corresponding to the second slice instance. The updated related information of the first subscription resource is shown in Table 4:

TABLE 4

| SUPI | ResID | SliceInfo | NotifyURL | CounterIDs |
|---|---|---|---|---|
| 13XXXXXX | 1 | Slice1 | XXX1 | C1 |
| | | | | C2 |
| | | Slice2 | XXX2 | C1 |
| | | | | C3 |

Step 606: The charging processing device returns a subscription response to the second subscription request (a second subscription response) to the policy control device B, where the second subscription response carries first information (a first status) of the second counter corresponding to the second slice instance and a first subscription identifier. Further, the second subscription response may further carry the user identifier and the identifier of the second slice instance.

Steps 607 and 608: The charging processing device determines that a notification message related to the first subscription resource needs to be sent to the policy control device A, generates the notification message for the first subscription resource, and sends the notification message (for example, a first notification message or a second notification message) for the first subscription resource to the policy control device A.

For descriptions of steps 607 and 608, refer to the detailed descriptions of steps 407 and 408. Details are not described herein again in this embodiment of this application.

Steps 609 and 610: The charging processing device determines that a notification related to a second subscription resource needs to be sent to the policy control device B, generates the notification message for the second subscription resource, and sends the notification message for the second subscription resource to the policy control device B.

For specific descriptions of steps 609 and 610, refer to steps 409 and 410. Details are not described herein again in this embodiment of this application.

Step 611: The policy control device A determines that the first subscription resource corresponding to the first slice instance needs to be unsubscribed from, and sends an unsubscription request for the first subscription resource (a first unsubscription request for short) to the charging processing device, where the unsubscription request for the first subscription resource carries the first subscription identifier Res-1 and the identifier of the first slice instance. The first subscription resource is subscription (for example, a subscription resource) corresponding to the first subscription request.

For specific descriptions of step 611, refer to step 411. Details are not described herein again in this embodiment of this application.

Step 612: After receiving the unsubscription request sent by the policy control device A for the first subscription resource, the charging processing device performs corresponding processing on the first subscription resource.

If the charging processing device determines, based on the first subscription identifier, that the first subscription resource is associated with only one slice instance, the charging processing device deletes the first subscription resource. If the charging processing device determines, based on the first subscription identifier, that the first subscription resource is associated with at least two slice instances, the charging processing device updates the related information of the first subscription resource. In this step, a determining result is that the first subscription resource is associated with two slice instances (namely, the first slice instance and the second slice instance, and correspondingly the information, about the first subscription resource, stored in the charging processing device is shown in Table 4). That the charging processing device updates the related information of the first subscription resource is specifically as follows: The charging processing device deletes the related information of the first slice instance from the stored information of the first subscription resource. The related information of the first slice instance includes the identifier of the first slice instance, the notification address corresponding to the first slice instance, and the identifier of the first counter corresponding to the first slice instance.

In an example, it is assumed that the related information that is of the first subscription resource of the user equipment and that is stored by the charging processing device is shown in Table 4. The first unsubscription request carries the first subscription identifier 1, and the identifier of the slice instance is slice1. The first subscription identifier is used to identify the first subscription resource. The charging processing device deletes, based on the information in the first unsubscription request, the related information of the first slice instance from the related information of the subscription resource. After the information in Table 4 is deleted based on the information in the first unsubscription request, the information is shown in Table 5:

TABLE 5

| SUPI | ResID | SliceInfo | NotifyURL | CounterIDs |
|---|---|---|---|---|
| 13XXXXXX | 1 | Slice2 | XXX2 | C1 C3 |

Step 613: The charging processing device returns a first unsubscription response to the policy control device A, where the first unsubscription response is an unsubscription response to the first unsubscription request.

Step 614: The policy control device B determines that the second subscription resource corresponding to the second slice instance needs to be unsubscribed from, and sends a second unsubscription request for the second subscription resource to the charging processing device, where the second unsubscription request for the second subscription resource carries the first subscription identifier Res-1 and the identifier of the second slice instance.

For detailed descriptions of step 614, refer to the detailed descriptions of step 611. Details are not described herein again in this embodiment of this application.

Step 615: After receiving the unsubscription request sent by the policy control device B for the first subscription resource, the charging processing device performs corresponding processing on the first subscription resource.

If the charging processing device determines, based on the first subscription identifier, that the first subscription resource is associated with only one slice instance, the charging processing device deletes the first subscription resource. If the charging processing device determines, based on the first subscription identifier, that the first subscription resource is associated with at least two slice instances, the charging processing device updates the related information of the first subscription resource. In this step, it is determined that the first subscription resource is associated with only one slice instance (namely, the second slice instance).

The charging processing device deletes the first subscription resource.

Step 616: The charging processing device returns a second unsubscription response to the policy control device B.

In an optional manner, the policy control device A or B may further send a subscription resource update request to the charging processing device. The subscription resource update request may carry the first subscription identifier, and carry a set of identifiers of all first counters that need to be re-subscribed to. After receiving the subscription resource update request, the charging processing device replaces an original first counter with the set of identifiers of first counters that is carried in the subscription resource update request.

In this embodiment, the subscription request (the first subscription request or the second subscription request) may further include an identifier of the policy control device. The identifier of the policy control device is used to indicate the charging processing device to determine subscription requests as different subscription requests when the charging processing device receives the subscription requests sent by different policy control devices. After receiving the request that carries the identifier of the user equipment and the identifier of the policy control device, the charging processing device determines, based on the identifier of the user equipment and the identifier of the policy control device, that a subscription resource that is of the user equipment and that corresponds to the policy control device does not exist, and creates a new subscription resource for the user equipment; or the charging processing device determines, based on the identifier of the user equipment and the identifier of the policy control device, that a subscription resource that is of the user equipment and that corresponds to the policy control device does not exist, and updates related information of an existing subscription resource of the user equipment (that is, add, to stored information of the existing subscription resource, information corresponding to the subscription request of the policy control device, where the information includes the information about the slice instance, the counter, and the notification address). In this method, the charging processing device may consider subscription requests from different policy control devices for same user equipment as new subscription requests and perform correct processing, to avoid rejection of repeated subscription requests.

According to this embodiment of this application, the policy control device deployed on each slice instance sends a subscription request corresponding to the slice instance to the charging processing device, and the charging processing device creates or allocates a subscription resource corresponding to the slice instance to the user equipment. In addition, after the status of the counter changes, the charging processing device notifies the policy control device deployed outside the slice instance of the status of the counter. In this way, the charging processing device may manage, by using one subscription resource, subscriptions to different slice instances accessed by same user equipment.

FIG. 7A-1 and FIG. 7A-2 are a flowchart of a method in which a policy control device 104 obtains and subscribes to information about a slice instance-related counter for user equipment according to an embodiment of this application. A method procedure corresponding to FIG. 7A-1 and FIG. 7A-2 corresponds to the system architecture in FIG. 2B. The policy control device 104 is deployed outside a slice instance. The policy control device 104 sends a subscription request, to indicate a charging processing device to create a subscription resource corresponding to a first slice instance. A difference from the procedure corresponding to FIG. 5 is that the charging processing device creates a shared subscription resource for subscription requests corresponding to different slice instances. The subscription resource is shared by a plurality of slice instances in a charging system, and the policy control device does not perceive that the subscription resource is the shared subscription resource. The method procedure mainly includes the following steps.

Steps 700 to 703: The policy control device determines information about a first counter (for example, a status, or a value of the counter) that is of the user and that corresponds to the first slice instance needs to be subscribed to, and sends a third subscription request corresponding to the first slice instance to the charging processing device. The charging processing device creates, for the user equipment, a first subscription resource corresponding to the first slice instance, and sends a subscription response to the third subscription request (a third subscription response for short) to the policy control device.

The policy control device is deployed outside the first slice instance. For detailed descriptions of steps 700 to 703, refer to the detailed descriptions of steps 400 to 403. Details are not described herein again in this embodiment of this application.

Related information that is of the first subscription resource and that is stored by the charging processing device includes an identifier of the user equipment, a subscription identifier, and related information of the first slice instance. The related information of the first slice instance includes a correspondence between an identifier of the first slice instance, an identifier of the counter corresponding to the first slice instance, and/or a notification address corresponding to the first slice instance, as shown in Table 3:

TABLE 3

| SUPI | ResID | SliceInfo | NotifyURL | CounterIDs |
|---|---|---|---|---|
| 13XXXXXX | 1 | Slice1 | XXX1 | C1 |
| | | | | C2 |

Step 704: The policy control device sends a fourth subscription request corresponding to a second slice instance to the charging processing device.

The policy control device determines that information about a second counter corresponding to the second slice instance needs to be subscribed to, and sends the fourth subscription request corresponding to the second slice instance to the charging processing device. The fourth subscription request corresponding to the second slice instance carries an identifier of the second slice instance and the identifier of the user equipment.

For descriptions of step 704, refer to the detailed descriptions of step 404. Details are not described herein again in this embodiment of this application.

Step 705: The charging processing device determines, based on the identifier of the user equipment, that the first subscription resource of the user equipment exists, and updates the related information of the first subscription resource.

For descriptions of step 705, refer to the detailed descriptions of step 605. Details are not described herein again in this embodiment of this application.

The updated related information of the first subscription resource is shown in Table 4:

TABLE 4

| SUPI | ResID | SliceInfo | NotifyURL | CounterIDs |
|---|---|---|---|---|
| 13XXXXXX | 1 | Slice1 | XXX1 | C1 |
| | | | | C2 |
| | | Slice2 | XXX2 | C1 |
| | | | | C3 |

Step 706: The charging processing device returns a subscription response to the fourth subscription request (a fourth subscription response) to the policy control device, where the fourth subscription response carries first information (a first status) of the second counter corresponding to the second slice instance and a first subscription identifier. Further, the fourth subscription response may further carry a user identifier and the identifier of the second slice instance.

Further, after receiving the first status of the second counter, the policy control device may generate a control policy for one or more PDU sessions of the user equipment on the second slice instance based on the first status of the second counter, and send the control policy to a session management function device.

Step 707 and 708: The charging processing device determines that a notification message for the first subscription resource needs to be sent to the policy control device, and generates the notification message. The charging processing device sends the notification message (a first notification message or a second notification message) to the policy control device.

For descriptions of steps 707 and 708, refer to the detailed descriptions of steps 407 and 408. Details are not described herein again in this embodiment of this application.

Steps 709 and 710: The charging processing device determines that a notification message for a second subscription resource needs to be sent to the policy control device, generates the notification message, and sends the notification message (a third notification message or a fourth notification message) to the policy control device.

For specific descriptions of steps 709 and 710, refer to steps 409 and 410. Details are not described herein again in this embodiment of this application.

Step 711: The policy control device determines that the first subscription resource corresponding to the first slice instance needs to be unsubscribed from, and sends a third unsubscription request for the first subscription resource (a third unsubscription request for short) to the charging processing device, where the third unsubscription request for the first subscription resource carries the first subscription identifier Res-1 and the identifier of the first slice instance.

For descriptions of step 711, refer to the detailed descriptions of step 411. Details are not described herein again in this embodiment of this application.

Step 712: After receiving the third unsubscription request sent by the policy control device for the first subscription resource, the charging processing device performs corresponding processing on the first subscription resource.

For descriptions of step 712, refer to the detailed descriptions of step 612. Details are not described herein again in this embodiment of this application.

After the information in Table 4 is processed based on the information in the third unsubscription request, the information is shown in Table 5:

35

36

TABLE 5

| SUPI | ResID | SliceInfo | NotifyURL | CounterIDs |
|------|-------|-----------|-----------|------------|
| 13XXXXXX | 1 | Slice2 | XXX2 | C1<br>C3 |

Step 713: The charging processing device sends an third unsubscription response to the third unsubscription request to the policy control device.

Step 714: The policy control device determines that the first subscription resource corresponding to the second slice instance needs to be unsubscribed from, and sends a fourth unsubscription request for the first subscription resource to the charging processing device, where the fourth unsubscription request for the first subscription resource carries the first subscription identifier Res-1 and the identifier of the second slice instance.

For detailed descriptions of step 714, refer to the detailed descriptions of step 611. Details are not described herein again in this embodiment of this application.

Step 715: After receiving the fourth unsubscription request that is for the first subscription resource corresponding to the second slice instance and that is sent by the policy control device, the charging processing device performs corresponding processing on the first subscription resource.

For detailed descriptions of step 715, refer to the detailed descriptions of step 615. Details are not described herein again in this embodiment of this application.

Step 716: The charging processing device sends an unsubscription response to the policy control device.

In an optional manner, the policy control device may further send a subscription resource update request to the charging processing device. The subscription resource update request may carry the first subscription identifier, and carry a set of identifiers of all first counters that need to be re-subscribed to. After receiving the subscription resource update request, the charging processing device replaces an original first counter with the set of identifiers of first counters that is carried in the subscription resource update request.

In this embodiment, the subscription request (the third subscription request or the fourth subscription request) may further include an identifier of the policy control device. The identifier of the policy control device is used to indicate the charging processing device to determine subscription requests as different subscription requests when the charging processing device receives the subscription requests sent by different policy control devices. After receiving the request that carries the identifier of the user equipment and the identifier of the policy control device, the charging processing device determines, based on the identifier of the user equipment and the identifier of the policy control device, that a subscription resource that is of the user equipment and that corresponds to the policy control device does not exist, and creates a new subscription resource for the user equipment; or the charging processing device determines, based on the identifier of the user equipment and the identifier of the policy control device, that a subscription resource that is of the user equipment and that corresponds to the policy control device does not exist, and updates related information of an existing subscription resource of the user equipment (that is, add, to stored information of the existing subscription resource, information corresponding to the subscription request of the policy control device, where the information includes the information about the slice instance, the counter, and the notification address). In this method, the charging processing device may consider subscription requests from different policy control devices for same user equipment as new subscription requests and perform correct processing, to avoid rejection of repeated subscription requests.

According to this embodiment of this application, the policy control device deployed outside the slice instance sends the subscription request corresponding to the slice instance to the charging processing device, but the subscription resource created by the charging processing device is a subscription resource shared by one or more slice instances accessed by the user equipment. In addition, after the status of the counter changes, the charging processing device notifies the policy control device deployed on the slice instance of the status of the counter. Therefore, the policy control device may generate a control policy based on the information about the counter, so that the policy control device can perform policy control on use of each service of the user equipment in a scenario in which the network slice instance is used.

FIG. 7B is a flowchart of a method in which a policy control device 104 obtains and subscribes to a slice instance-based counter for user equipment according to an embodiment of this application. A method procedure corresponding to FIG. 7B corresponds to the system architecture in FIG. 2B. The policy control device 104 is deployed outside a slice instance. The policy control device sends a subscription request, and the charging processing device creates, for the user equipment, a subscription resource shared by all slice instances accessed by the user equipment. The method procedure mainly includes the following steps.

Steps 700' and 701': The policy control device determines that a status of a first counter that is of the user and that corresponds to a first slice instance needs to be subscribed to, and sends a fifth subscription request corresponding to the user equipment to the charging processing device.

Specifically, the policy control device determines that the status of the first counter that is of the user and that corresponds to the first slice instance needs to be subscribed to, but currently there is no subscription resource available to the user, and sends the fifth subscription request to the charging processing device. The fifth subscription request corresponding to the user equipment is used to request to create a third subscription resource for the user equipment. The fifth subscription request corresponding to the user equipment carries an identifier of the user equipment, an identifier of the first slice instance, and a notification address. The identifier of the first slice instance is used to indicate to subscribe to information about the first counter that is of the user equipment and that corresponds to the first slice instance, and corresponds to an identifier of the first counter. The notification address is a notification address corresponding to the user equipment.

For the fifth subscription request corresponding to the user equipment, refer to the following example:

```
Request:
{
    "UserID":"SUPI",
    "NotifyURL":"XXX",
    "CounterIDs":{
        "CounterID":"1",
        "SliceID":"S-NSSAI1",
    },
```

-continued

```
        "CounterIDs":{
            "CounterID":"2"
        }
    }
```

A value of the parameter sliceID is the identifier of the first slice instance, and the parameter CounterID indicates that included content is the information about the first counter. The information about the first counter includes a first counter identifier parameter counterID (where the value of the parameter counter ID is the identifier of the first counter that is of the user and that corresponds to the first slice instance, and the identifier of the first counter corresponds to the user equipment), and a value of the parameter NotifyURL is the notification address corresponding to the user equipment. The notification address corresponding to the user equipment is used by the charging processing device to notify the policy control device of the information about the counter of the user, for example, a change of status information of the counter.

For descriptions that the policy control device determines that the status of the first counter that is of the user and that corresponds to the first slice instance needs to be subscribed to, refer to the descriptions of step 400. Details are not described herein again in this embodiment of this application.

Step 702': The charging processing device creates the third subscription resource for the user equipment, allocates a third subscription identifier Res-3 to the third subscription resource, and stores related information of the third subscription resource.

For detailed descriptions of step 702', refer to the descriptions of step 402. Details are not described again in this embodiment of this application.

The stored related information of the third subscription resource is shown in Table 6:

TABLE 6

| SUPI | ResID | NotifyURL | SliceInfo | CounterIDs |
|------|-------|-----------|-----------|------------|
| 13XXXXXX | 3 | XXX1 | Slice1 | C1 |
|  |  |  | Slice1 | C2 |

Step 703': The charging processing device returns a subscription response to the fifth subscription request (a fifth subscription response for short) to the policy control device, where the fifth subscription response includes the third subscription identifier and first information of the first counter, the first information includes a first status of the first counter and the identifier of the first slice instance corresponding to the first counter, and the third subscription identifier is used to identify the third subscription resource. The identifier of the first slice instance corresponds to the first counter. For details, refer to the following example:

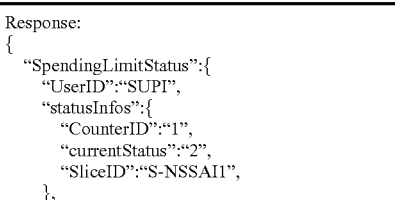

```
Response:
{
    "SpendingLimitStatus":{
        "UserID":"SUPI",
        "statusInfos":{
            "CounterID":"1",
            "currentStatus":"2",
            "SliceID":"S-NSSAI1",
        },
```

-continued

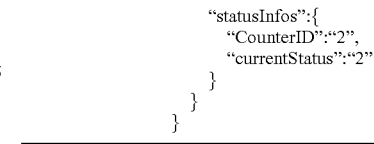

```
        "statusInfos":{
            "CounterID":"2",
            "currentStatus":"2"
        }
    }
}
```

Further, after receiving the first status of the first counter, the policy control device may generate a control policy for a PDU session of the user equipment based on the first status of the first counter, and send the control policy to a session management function device.

Step 704': The policy control device determines that information about a second counter corresponding to a second slice instance needs to be subscribed to, and sends a first update request for the third subscription resource to the charging processing device, where the first update request carries the third subscription identifier, an identifier of the second counter, and an identifier of the second slice instance corresponding to the second counter, and the third subscription identifier is used to identify the third subscription resource.

Before sending the first update request for the third subscription resource, the policy control device further determines that a status of the second counter that is of the user and that corresponds to the second slice instance needs to be subscribed to. For specific descriptions that the policy control device determines that the status of the second counter that is of the user and that corresponds to the second slice instance needs to be subscribed to, refer to the descriptions of step 400. Details are not described again in this embodiment of this application.

Step 705': After receiving the first update request, the charging processing device stores related information of the second slice instance in the related information of the third subscription resource, where the related information of the second slice instance includes an identifier of the second counter and the identifier of the second slice instance corresponding to the second counter.

Specifically, the charging processing device adds the related information of the second slice instance to the related information of the third subscription resource based on the third subscription identifier. The related information of the second slice instance includes the identifier of the second slice instance and the identifier of the second counter.

The updated related information of the third subscription resource is shown in Table 7:

TABLE 7

| SUPI | ResID | NotifyURL | SliceInfo | CounterIDs |
|------|-------|-----------|-----------|------------|
| 13XXXXXX | 3 | XXX1 | Slice1 | C1 |
|  |  |  | Slice1 | C2 |
|  |  |  | Slice2 | C1 |
|  |  |  | Slice2 | C3 |

Step 706': The charging processing device returns a response to the first update request (a first update response for short) to the policy control device, where the first update response carries first information of the second counter, and the first information includes the first status of the first counter and the identifier of the second slice instance corresponding to the second counter.

Step 707': The charging processing device determines that a notification message for the first subscription resource needs to be sent to the policy control device, and generates the notification message, where the notification message for the first subscription resource carries information corresponding to the first slice instance, and the notification message for the third subscription resource may be a first notification message indicating that information changes or a second notification message indicating that the subscription terminates.

For detailed descriptions of the notification message in step 707', refer to the descriptions of step 407. Details are not described herein again in this embodiment of this application.

Step 708': The charging processing device sends the first notification message to the policy control device.

The first notification message carries second information of the first counter, and the second information includes a second status of the first counter and the identifier of the corresponding first slice instance.

Further, after receiving the first notification message, the policy control device may generate a control policy for a PDU session of the user equipment based on the second status of the first counter, and send the generated control policy to the session management function device.

For detailed descriptions of the first notification message in step 708', refer to the descriptions of step 408. Details are not described herein again in this embodiment of this application.

Step 709': The charging processing device determines that the notification message for the third subscription resource needs to be sent to the policy control device, and generates the notification message for the third subscription resource. The notification message in this step is a notification message for a second subscription resource, and the notification message for the second subscription resource may be a third notification message indicating that information changes or a fourth notification message indicating that subscription terminates.

For detailed descriptions of the notification message in step 709', refer to the descriptions of step 407. Details are not described herein again in this embodiment of this application.

Step 710': The charging processing device sends the notification message for the third subscription resource to the policy control device.

The notification message for the third subscription resource carries second information of the second counter, and the second information includes a second status and the identifier of the second slice instance corresponding to the second counter.

Further, after receiving the third notification message, the policy control device may generate a control policy for a PDU session of the UE based on the second status of the second counter, and send the generated control policy to the session management function device.

For detailed descriptions of the notification message for the third subscription resource in step 710', refer to the descriptions in step 410. Details are not described herein again in this embodiment of this application.

For step 707' to step 710', if the charging processing device determines that the status of the first counter corresponding to the first slice instance and the status of the second counter corresponding to the second slice instance change at the same time, the charging processing device sends the notification message to the policy control device, where the notification message carries the second information of the first counter and the second information of the second counter at the same time, the second information of the first counter includes the second status of the first counter and the identifier of the corresponding first slice instance, and the second information of the second counter includes the second status of the second counter and the identifier of the corresponding second slice instance.

Step 711': The policy control device determines that information about the second counter corresponding to the second slice instance needs to be unsubscribed from, and sends a second update request for the third subscription resource to the charging processing device.

Specifically, the policy control device generates the second update request for the third subscription resource, where the second update request includes an identifier that is of a counter and that is obtained after the identifier of the second counter corresponding to the second slice instance is deleted from a counter set currently subscribed to by the user. To be specific, the second update request carries a counter full set that needs to be re-subscribed to, to replace a previously subscribed counter full set. Therefore, unsubscribing from the second counter is to delete the identifier of the second counter from the previously subscribed counter full set.

When the policy control device determines that the policy decision of the user does not need the status of the second counter (for example, the policy control device does not need to generate the control policy of the user), the policy control device determines that the information about the second counter corresponding to the second slice instance needs to be unsubscribed from. For example, the policy control device determines that there is no PDU session set up for the user equipment on the second slice instance (where all PDU sessions set up for the user equipment on the second slice instance are released), or that there is a PDU session set up for the user equipment on the slice instance, but the PDU session set up for the user equipment does not need to subscribe to the status of counter2 based on subscription data or an operator policy.

In this embodiment of this application, the policy control device stores subscription-related information, for example, a subscription identifier, an identifier of a subscribed counter, and an identifier of a slice instance corresponding to the identifier of the counter. The policy control device may generate the second update request based on the stored subscription-related information.

Step 712': After receiving the second update request for the third subscription resource, the charging processing device performs corresponding processing on the subscription resource based on the identifier of the subscription resource in the second update request.

Specifically, after receiving the second update request, the charging processing device replaces information about the third subscription resource with information carried in the second update request. For example, the second update request carries the identifier of the first counter and the identifier of the first slice instance corresponding to the first counter. The charging processing device replaces the related information of the first slice instance and the related information of the second slice instance in the related information of the third subscription resource with a correspondence that is between the identifier of the first counter and the first slice instance and that is in the update request. Because the second update request does not carry the related information of the second slice instance, the updated related information of the third subscription resource does not include the related information of the first slice instance.

In an example, the related information that is of the third subscription resource of the user equipment and that is stored by the charging processing device is shown in Table 7. The subscription identifier carried in the second update request is 3, the identifier of the slice instance is slice1, and the identifiers of the counters are C1 and C3. The charging processing device updates, based on the information in the second update request, the stored information that is of the third subscription resource and that is related to the slice instance. The updated related information of the third subscription resource is shown in Table 8:

TABLE 8

| SUPI | ResID | NotifyURL | SliceInfo | CounterIDs |
|---|---|---|---|---|
| 13XXXXXX | 3 | XXX1 | Slice1 | C1 |
|  |  |  | Slice1 | C2 |

Step 713': The charging processing device returns a response to the second update request (a second update response for short) to the policy control device.

The second update response carries an identifier of a counter that is currently subscribed to and an identifier of a corresponding slice instance. In correspondence to the information in the table, the second update response carries the information (the status herein) about the first counter (the counter corresponding to the first slice instance) and the identifier of the first slice instance corresponding to the first counter.

Step 714': The policy control device determines that the third subscription resource of the user equipment needs to be unsubscribed from, and sends a fifth unsubscription request for the third subscription resource to the charging processing device, where the fifth unsubscription request carries the subscription identifier Res-1. The third subscription resource corresponds to the subscription resource created for the third subscription request.

Specifically, when determining that the policy decision of the user does not need a status of any counter (for example, the policy control device does not need to generate the control policy of the user), the policy control device determines that the third subscription resource of the user needs to be unsubscribed from.

Step 715': After receiving the unsubscription request, the charging processing device deletes the third subscription resource.

Step 716': The charging processing device returns a response to the fifth unsubscription request to the policy control device.

In this embodiment, the subscription request may further include an identifier of the policy control device. The identifier of the policy control device is used to indicate the charging processing device to determine subscription requests as different subscription requests when the charging processing device receives the subscription requests sent by different policy control devices. After receiving the request that carries the identifier of the user equipment and the identifier of the policy control device, the charging processing device determines, based on the identifier of the user equipment and the identifier of the policy control device, that a subscription resource that is of the user equipment and that corresponds to the policy control device does not exist, and creates a new subscription resource for the user equipment; or determines, based on the identifier of the user equipment and the identifier of the policy control device, that a subscription resource that is of the user equipment and that corresponds to the policy control device does not exist, and updates related information of an existing subscription resource of the user equipment (that is, add, to stored information of the existing subscription resource, information corresponding to the subscription request of the policy control device, where the information includes the information about the slice instance, the counter, and the notification address). In this method, the charging processing device may consider subscription requests from different policy control devices for same user equipment as new subscription requests and perform correct processing, to avoid rejection of repeated subscription requests.

In this embodiment of this application, the policy control device deployed outside the slice instance sends the subscription request to the charging processing device, and the subscription resource created by the charging processing device is a subscription resource shared by one or more slice instances accessed by the user equipment, but the counter corresponds to the identifier of the slice instance, so that the charging processing device can determine a slice processing counter, and after a status of the counter changes, the charging processing device notifies the policy control device of the status of the counter related to the slice instance. Therefore, the policy control device may generate a control policy based on the information about the counter corresponding to the network slice instance, so that the policy control device can generate corresponding control policies for services of the user equipment in different slices in a scenario in which the network slice instance is used.

Figure 8:
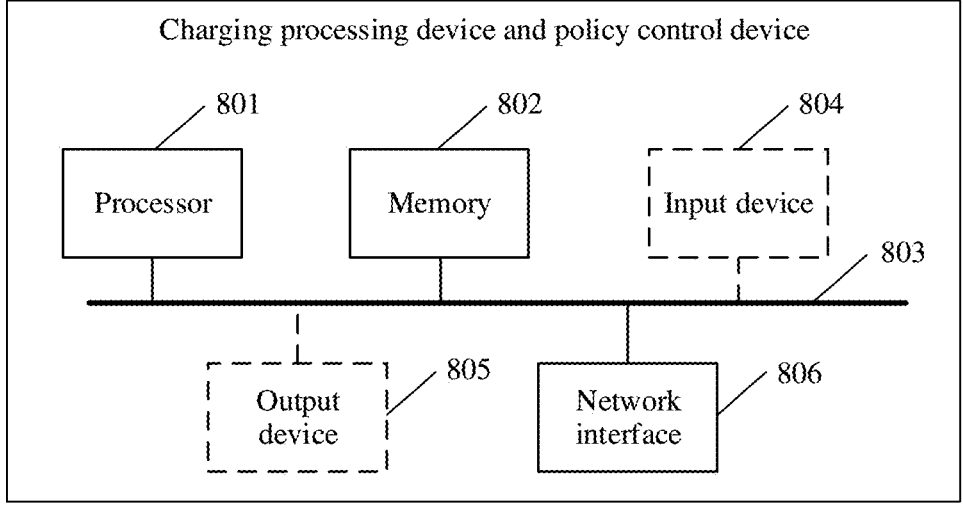
FIG. 8 is a schematic diagram of a hardware structure of a session management function device, a charging processing device, or a policy control device according to an embodiment of this application.

FIG. 8 is a diagram of a hardware structure of a charging processing device 101 or a policy control device 104 according to an embodiment of this application. The charging processing device 101 (for example, 101 in FIG. 1A) and the policy control device 104 (for example, the policy control device 104 in FIG. 1A) in this embodiment of this application may all be implemented by using a general-purpose computer hardware structure shown in FIG. 7, and include a processor 801, a memory 802, a bus 803, an input device 804, an output device 805, and a network interface 806, where the input device 804 and the output device 805 are optional.

Specifically, the memory 802 may include a computer storage medium in a form of a volatile memory and/or a nonvolatile memory, for example, a read-only memory and/or a random access memory. The memory 802 may store an operating system, an application program, another program module, executable code, and program data.

The input device 804 may be configured to input information, so that a system administrator operates and manages the charging processing device 101 or the policy control device 104, and the like. For example, a user account risk threshold is configured on the charging processing device 101, and storage space of quota management mode indication information is managed on the policy control device 104. The input device 804 may be a keyboard or a pointing device, such as a mouse, a trackball, a touchpad, a scanner, or a similar device, and may be connected to the processor 801 through the bus 803.

The output device 805 may be configured to output information, so that the system administrator operates and manages the charging processing device 101 or the policy control device 104. For example, the user account risk threshold is displayed on the charging processing device 101, and remaining storage space is displayed on the policy control device 104. In addition to a monitor, the output device 805 may be another peripheral output device, or may be connected to the processor 801 through the bus 803.

A session management function device 102, the charging processing device 101, or the policy control device 104 may all be connected to a network through the network interface 806, for example, connected to a local area network (LAN). In a network connection environment, computer-executable instructions stored in the charging processing device 101 or the policy control device 104 may be stored in a remote storage device, and are not limited to being locally stored.

When the processor 801 in the charging processing device 101 executes the executable code or the application program stored in the memory 802, the charging processing device 101 may perform the method steps corresponding to the charging processing device 101 in all the foregoing embodiments, for example, steps 401 to 416, 501 to 516, 601 to 616, 701 to 713, and 701' to 715'. For a specific execution process, refer to the foregoing embodiments. Details are not described herein again.

When the processor 801 in the policy control device 104 executes the executable code or the application program stored in the memory 802, the policy control device may perform the method steps corresponding to the policy control device 104 in all the foregoing embodiments, for example, steps 400 and 401, 403 and 404, 406, 408, 410 and 411, 413 and 414, 416, 500 and 501, 503 and 504, 506, 508, 510 and 511, 513 and 514, 516, 600 and 601, 603 and 604, 606, 608, 610 and 611, 613 and 614, 616, 700 and 701, 703 and 704, 706, 708, 710 and 711, 713 and 714, 716, 700' and 701', 703' and 704', 706', 708', 710' and 711', 713' and 714', and 716'. For a specific execution process, refer to the foregoing embodiments. Details are not described herein again.

It should be noted that some of the foregoing steps are performed by two devices because one device performs sending and the other device performs receiving. For example, in step 401, the policy control device 104 sends a first subscription request, and the charging processing device 101 receives a first policy.

Figure 9:
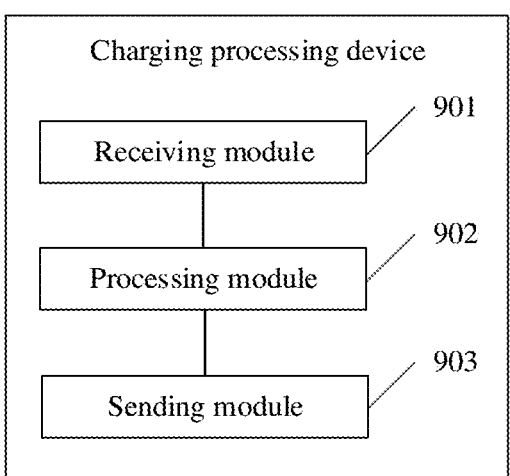
FIG. 9 is a schematic diagram of a logical structure of a charging processing device according to an embodiment of this application.
Figure 10:
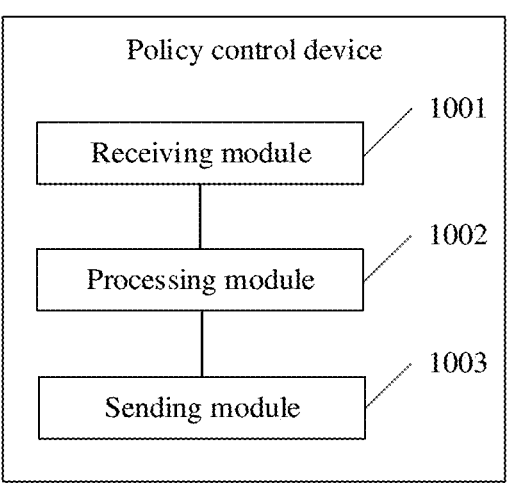
FIG. 10 is a schematic diagram of a logical structure of a policy control device according to an embodiment of this application.

FIG. 9 is a schematic diagram of a logical structure of a charging processing device 101 according to an embodiment of this application. The charging processing device 101 (101) is configured to perform the methods performed by the charging processing device in FIG. 3 to FIG. 7B. The charging processing device 101 includes: a receiving module, configured to receive a first subscription request, where the first subscription request carries an identifier of a first slice instance, an identifier of user equipment, and a notification address corresponding to the first slice instance; and the receiving module 901 is mainly configured to perform any receiving step on the charging processing device 101 side in the foregoing embodiments, for example, step 401, 404, 411, 414, 501, 504, 511, 514, 601, 604, 611, 614, 701, 704, 711, 714, 701', 704', 711', or 714'; and a sending module, configured to return a first subscription response, where the first subscription response includes a first status of a first counter corresponding to the first slice instance and a first subscription identifier; and the sending module 903 is mainly configured to perform any sending step on the charging processing device 101 side in the foregoing embodiments, for example, step 403, 406, 408, 410, 413, 416, 503, 506, 508, 510, 513, 516, 603, 606, 608, 610, 613, 616, 703, 706, 708, 710, 713, 716, 703', 706', 708', 710', 713', or 716'.

In addition, the charging processing device 101 further includes a processing module 902, configured to: create, for the user equipment, a first subscription resource corresponding to the first slice instance, and store related information of the first subscription resource, where the related information of the first subscription resource includes a correspondence between the identifier of the first slice instance, the notification address, and an identifier of the first counter;

and the processing module 902 is mainly configured to perform any processing step on the charging processing device 101 side in the foregoing embodiments, for example, step 402, 405, 407, 409, 412, 415, 502, 505, 507, 509, 512, 515, 602, 605, 607, 609, 612, 615, 702, 705, 707, 709, 712, 715, 702', 705', 707', 709', 712', or 715'.

FIG. 9 is a schematic diagram of a logical structure of a policy control device 104 according to an embodiment of this application. The policy control device 104 (104) is configured to determine a policy for a user service. The policy control device 104 includes: a receiving module 1001, configured to receive a first subscription response, where the first subscription response includes a first status of a first counter corresponding to a first slice instance and a first subscription identifier; and the receiving module 1001 is mainly configured to perform any receiving step performed by the policy control device 104 in the foregoing embodiments, for example, step 403, 406, 408, 410, 413, 416, 503, 506, 508, 510, 513, 516, 603, 606, 608, 610, 613, 616, 703, 706, 708, 710, 713, 716, 703', 706', 708', 710', 713', or 716'; and a processing module 1002, configured to determine that the status of the first counter that is of a user and that corresponds to the first slice instance needs to be subscribed to, where the processing module 1002 is mainly configured to perform any step of determining, processing, and generating a policy by the policy control device 104 in the foregoing embodiments, for example, step 400, 500, 600, 700, or 700'; and a sending module 1003, configured to send a first subscription request, where the first subscription request carries an identifier of the first slice instance, an identifier of user equipment, and a notification address corresponding to the first slice instance; and the sending module 1003 is mainly configured to perform any sending step performed by the policy control device 104 in the foregoing embodiments, for example, step 401, 404, 411, 414, 501, 504, 511, 514, 601, 604, 611, 614, 701, 704, 711, 714, 701', 704', 711', or 714'.

The charging processing device 101 shown in FIG. 8 and the policy control device 104 shown in FIG. 9 are presented in a form of functional modules. The "module" herein may be an application-specific integrated circuit (ASIC), a circuit, a processor and a memory that execute one or more software or firmware programs, an integrated logic circuit, and/or another device that can provide the foregoing functions. In a simple embodiment, a person skilled in the art may figure out that these devices may alternatively be in the form shown in FIG. 6A and FIG. 6B. For example, the receiving module 901, the processing module 902, the sending module 903, the receiving module 1001, the processing module 902, and the sending module 1003 may all be implemented through the processor 801 and the memory 802 in FIG. 6A and FIG. 6B, for example, implemented by executing code stored in the memory 802 by the processor 801.

A person of ordinary skill in the art may be aware that, in combination with the examples described in embodiments disclosed in this specification, units and algorithm steps can be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person of ordinary skill in the art that, for ease and brief description, for a detailed working process of the foregoing system, apparatus and units, refer to a corresponding process in the foregoing method embodiments, and details are not described herein again.

In the several embodiments provided in this application, it should be understood that the disclosed system, apparatus, and method may be implemented in other manners. For example, division into the units is merely logical function division and may be other division during actual implementation. For example, a plurality of units or components may be combined or integrated into another system, or some features may be ignored or may not be performed. In addition, the displayed or discussed mutual couplings or direct couplings or communication connections may be implemented through some interfaces. The indirect couplings or communication connections between the apparatuses or units may be implemented in electrical, mechanical, or other forms.

The units described as separate parts may or may not be physically separate, and parts displayed as units may or may not be physical units, in other words, may be located in one position, or may be distributed on a plurality of network units. Some or all of the units may be selected based on actual requirements to achieve the objectives of the solutions of embodiments in this application.

In addition, functional units in embodiments of this application may be integrated into one processing unit, each of the units may exist alone physically, or two or more units may be integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of this application essentially, or the part contributing to the conventional technology, or all or some of the technical solutions may be implemented in a form of a software product. The computer software product is stored in a storage medium and includes several instructions for instructing a computer device (which may be a personal computer, a server, a network device, or the like) to perform all or some of the steps of the methods in embodiments of this application. The foregoing storage medium includes: any medium that can store program code, such as a USB flash drive, a portable hard disk, a read-only memory, a random access memory, a magnetic disk, or an optical disc.

The foregoing descriptions are merely specific implementations of this application, but are not intended to limit the protection scope of this application. Any modification or replacement readily figured out by a person skilled in the art within the technical scope disclosed in this application shall fall within the protection scope of this application. Therefore, the protection scope of this application shall be subject to the protection scope of the claims.

What is claimed is:

1. A method, comprising:
sending, by a policy control device, a subscription request, wherein the subscription request comprises an identifier of a first slice instance and an identifier of user equipment, the subscription request corresponds to the first slice instance, the subscription request is a request to create, for the user equipment, a first subscription resource corresponding to the first slice instance, the identifier of the first slice instance indicates that the first subscription resource corresponds to the first slice instance, and the subscription request corresponding to the first slice instance further carries a notification address corresponding to the first slice instance; and
receiving, by the policy control device, a subscription response, wherein the subscription response comprises first information of a first counter corresponding to the first slice instance and a subscription identifier, and wherein the first counter is a counter of user consumption in a charging processing device.

2. The method according to claim 1, further comprising:
receiving, by the policy control device, the identifier of the first slice instance, wherein the first slice instance is accessed by the user equipment; and
determining, by the policy control device based on subscription information of the user equipment, that information about the first counter corresponding to the first slice instance needs to be subscribed to.

3. The method according to claim 1, further comprising:
receiving, by the policy control device, a notification message that is for the first subscription resource and that is sent by the charging processing device using the notification address corresponding to the first slice instance, wherein the notification message for the first subscription resource carries the identifier of the first slice instance, second information of the first counter, or a subscription termination indication of the first subscription resource; and
generating, by the policy control device, an update control policy of the user equipment based on the second information of the first counter, or deleting, by the policy control device based on the subscription termination indication of the first subscription resource, the first subscription resource corresponding to the first slice instance.

4. The method according to claim 1, further comprising:
determining, by the policy control device, to unsubscribe from the first subscription resource; and
sending, by the policy control device to the charging processing device, an unsubscribe request based on the subscription request.

5. The method according to claim 1, wherein the first slice instance is a slice instance in a plurality of slice instances accessible by the user equipment, and wherein the charging processing device creates different subscription resources for different slices of the plurality of slice instances accessible by the user equipment.

6. A method, comprising:
receiving, by a charging processing device, a subscription request, wherein the subscription request comprises an identifier of a first slice instance and an identifier of user equipment, the subscription request corresponds to the first slice instance, the subscription request is a request to create, for the user equipment, a first subscription resource corresponding to the first slice instance, the identifier of the first slice instance indicates that the first subscription resource corresponds to the first slice instance, and the subscription request corresponding to the first slice instance further carries a notification address corresponding to the first slice instance; and
returning, by the charging processing device, a subscription response, wherein the subscription response comprises first information of a first counter corresponding to the first slice instance and a subscription identifier, and wherein the first counter is a counter of user consumption in the charging processing device.

7. The method according to claim 6, wherein the method further comprises:

creating, by the charging processing device, the first subscription resource corresponding to the first slice instance, and storing related information of the first subscription resource, wherein the related information of the first subscription resource comprises the identifier of the first slice instance, the notification address corresponding to the first slice instance, and an identifier of the first counter.

8. The method according to claim 7, wherein the subscription response responds to the subscription request corresponding to the first slice instance, the subscription identifier is a first subscription identifier, and the method further comprises:

receiving, by the charging processing device, a subscription request corresponding to a second slice instance, wherein the subscription request corresponding to the second slice instance carries an identifier of the second slice instance and the identifier of the user equipment;

determining, by the charging processing device based on the identifier of the user equipment, that the first subscription resource of the user equipment exists, and updating the related information of the first subscription resource; and returning, by the charging processing device, a subscription response to the subscription request corresponding to the second slice instance, wherein the subscription response to the subscription request corresponding to the second slice instance comprises first information of a second counter corresponding to the second slice instance and the first subscription identifier.

9. The method according to claim 8, further comprising:

receiving, by the charging processing device, an unsubscribe request for the first subscription resource, wherein the unsubscribe request for the first subscription resource carries the identifier of the second slice instance and the first subscription identifier; and determining, by the charging processing device, that the first subscription resource is associated with only the second slice instance, and deleting the first subscription resource.

10. The method according to claim 7, further comprising:

receiving, by the charging processing device, a subscription request corresponding to a second slice instance, wherein the subscription request corresponding to the second slice instance carries an identifier of the second slice instance and the identifier of the user equipment;

creating, by the charging processing device for the user equipment based on the identifier of the second slice instance and the identifier of the user equipment, a second subscription resource corresponding to the second slice instance, and storing related information of the second subscription resource; and returning, by the charging processing device, a subscription response to the subscription request corresponding to the second slice instance, wherein the subscription response to the subscription request corresponding to the second slice instance comprises first information of a second counter corresponding to the second slice instance and a second subscription identifier.

11. The method according to claim 7, further comprising:

when the charging processing device determines that information about the first counter changes, sending, by the charging processing device, a first notification message using the notification address corresponding to the first slice instance, wherein the first notification message carries the identifier of the first slice instance and second information of the first counter.

12. A charging processing device, comprising at least one processor and a memory, wherein the memory stores program instructions, and the program instructions are executed by the at least one processor, to implement the method according to claim 6.

13. The method according to claim 8, further comprising:

receiving, by the charging processing device, an unsubscribe request for the first subscription resource, wherein the unsubscribe request for the first subscription resource carries the identifier of the second slice instance and the first subscription identifier; and determining, by the charging processing device, that the first subscription resource is associated with at least two slice instances, and updating the related information of the first subscription resource.

14. The method according to claim 6, further comprising:

when the charging processing device determines that the first subscription resource needs to be terminated, sending, by the charging processing device, a second notification message using the notification address corresponding to the first slice instance, wherein the second notification message carries the identifier of the first slice instance and a subscription termination indication of the first subscription resource.

15. The method according to claim 6, further comprising:

when the charging processing device determines that information about a second counter changes, sending, by the charging processing device, a third notification message using a notification address corresponding to a second slice instance, wherein the third notification message carries an identifier of the second slice instance and second information of a second counter.

16. The method according to claim 6, further comprising:

when the charging processing device determines that a second subscription needs to be terminated, sending, by the charging processing device, a fourth notification message using a notification address corresponding to a second slice instance, wherein the fourth notification message carries an identifier of the second slice instance and a subscription termination indication of a second subscription resource.

17. A policy control device, comprising at least one processor and a memory, wherein the memory stores program instructions, and the program instructions are executed by the at least one processor, to perform operations comprising:

sending a subscription request, wherein the subscription request comprises an identifier of a first slice instance and an identifier of user equipment, the subscription request corresponds to the first slice instance, the subscription request is a request to create, for the user equipment, a first subscription resource corresponding to the first slice instance, the identifier of the first slice instance indicates that the first subscription resource corresponds to the first slice instance, and the subscription request corresponding to the first slice instance further carries a notification address corresponding to the first slice instance; and receiving a subscription response, wherein the subscription response comprises first information of a first counter corresponding to the first slice instance and a subscription identifier, and wherein the first counter is a counter of user consumption in a charging processing device.

18. The policy control device according to claim 17, the operations further comprising:

receiving the identifier of the first slice instance, wherein the first slice instance is accessed by the user equipment; and determining, based on subscription information of the user equipment, that information about the first counter corresponding to the first slice instance needs to be subscribed to.

19. The policy control device according to claim 17, the operations further comprising:

receiving a notification message that is for the first subscription resource and that is sent by the charging processing device using the notification address corresponding to the first slice instance, wherein the notification message for the first subscription resource carries the identifier of the first slice instance, second information of the first counter, or a subscription termination indication of the first subscription resource; and generating an update control policy of the user equipment based on the second information of the first counter, or deleting, by the policy control device based on the subscription termination indication of the first subscription resource, the first subscription resource corresponding to the first slice instance.

20. The policy control device according to claim 17, the operations further comprising:

determining to unsubscribe from the first subscription resource; and sending, to the charging processing device, an unsubscribe request based on the subscription request.

* * * * *